FIG. 7

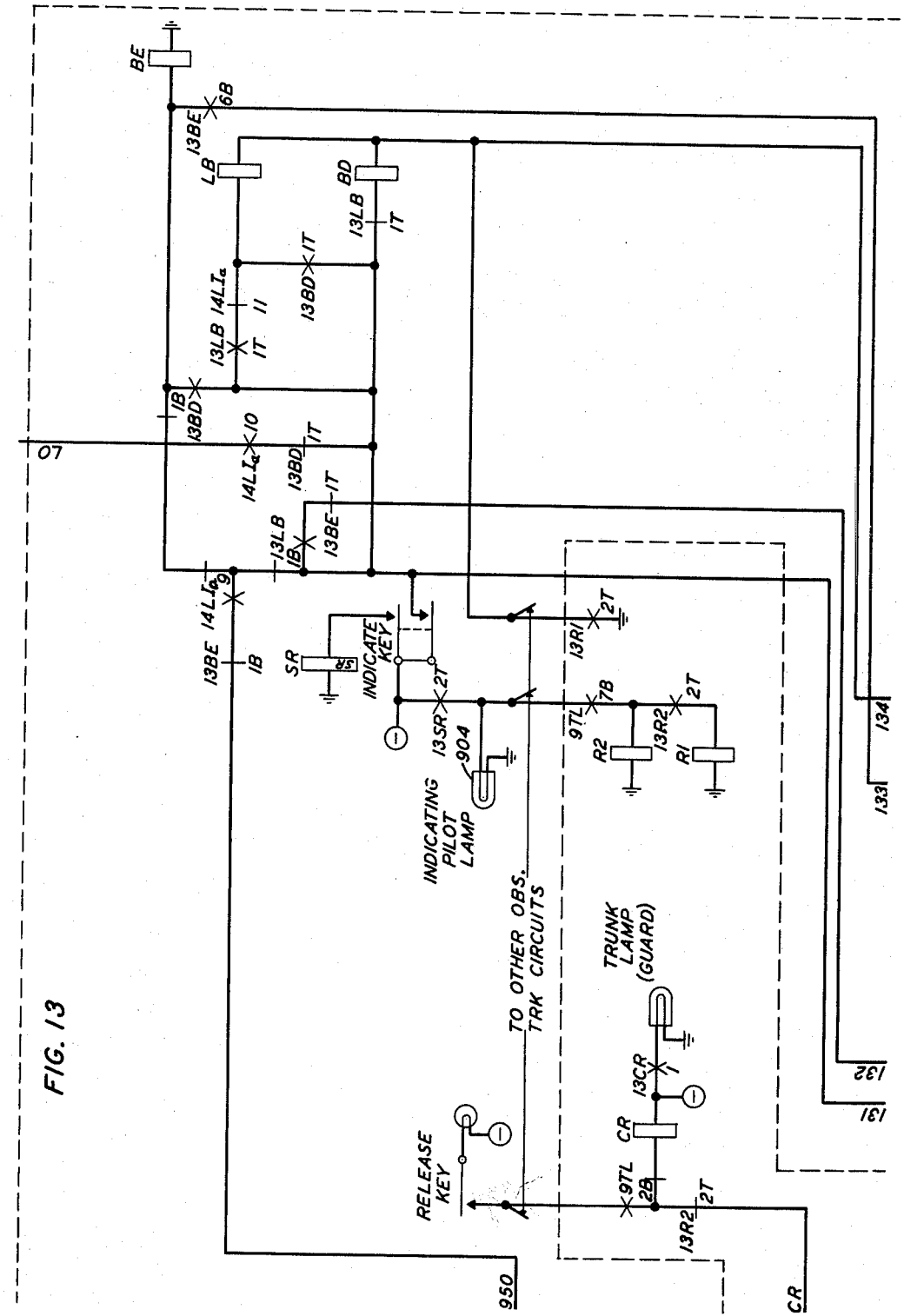

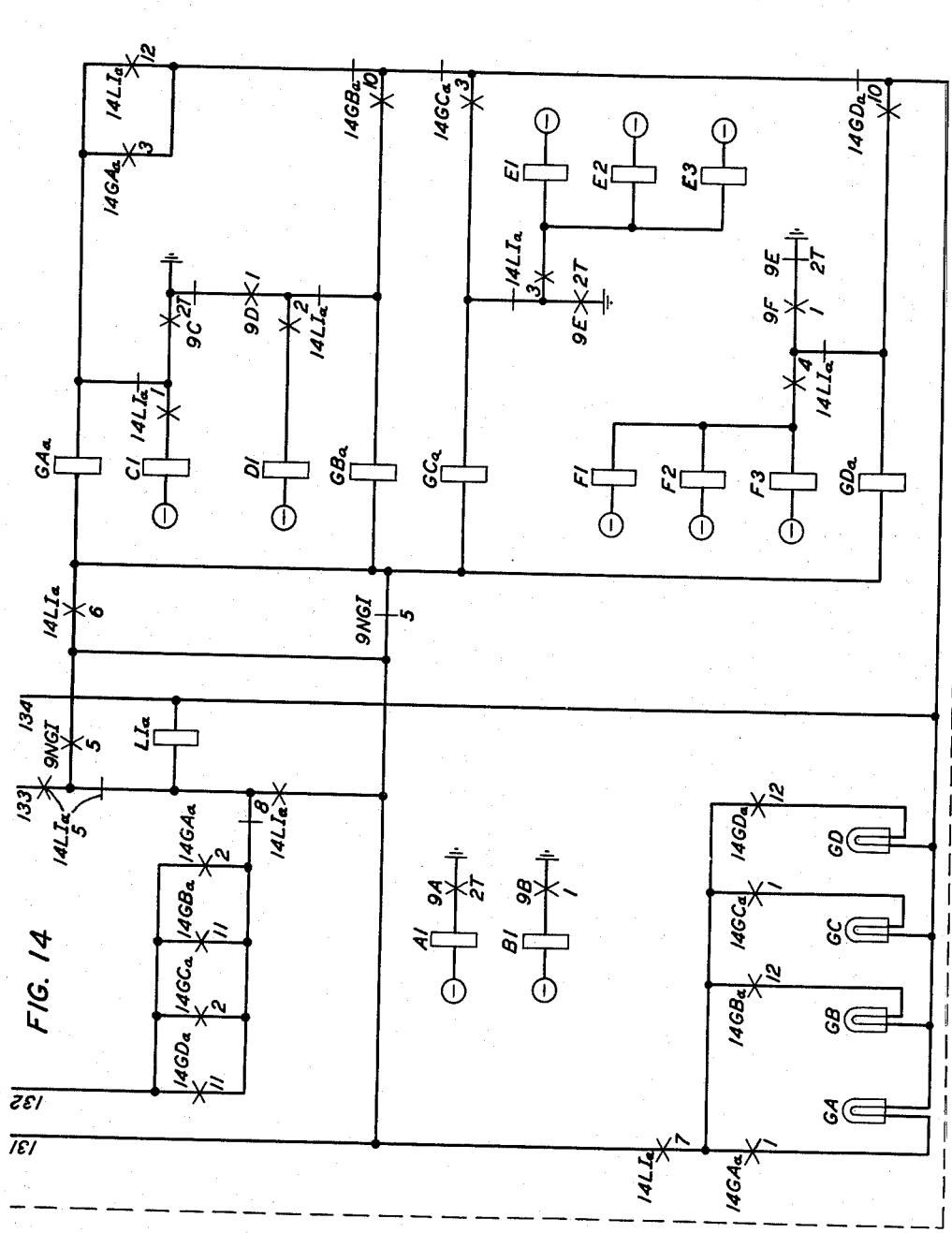

June 8, 1965 W. G. BARRETT ETAL 3,188,401
SELECTIVE SERVICE OBSERVING CIRCUIT
Filed Nov. 15, 1961
15 Sheets-Sheet 15
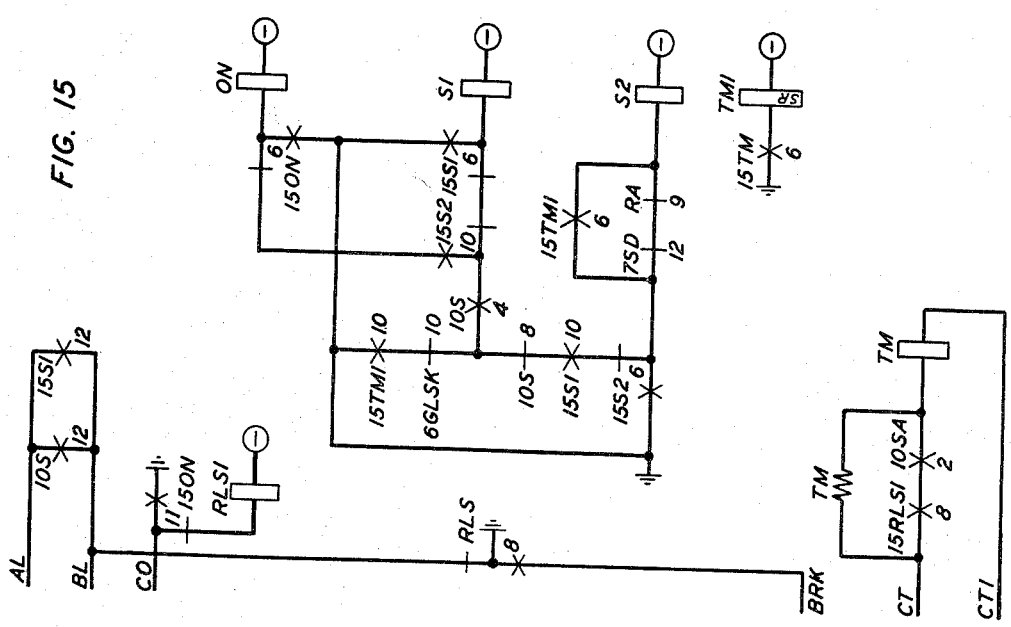

3,188,401
SELECTIVE SERVICE OBSERVING CIRCUIT
William G. Barrett, Middletown, and George E. Koch, Middletown Township, Monmouth County, N.J., assignors to Bell Telephone Laboratories, Incorporated, New York, N.Y., a corporation of New York
Filed Nov. 15, 1961, Ser. No. 152,427
11 Claims. (Cl. 179—175.2)

This invention relates to telephone systems and, more particularly, to service observing circuits and its general object is to improve the efficiency of such circuits.

Service observing circuits are typically employed at telephone system switching points such as central offices, toll offices and the like, to enable an observer to monitor calls on selected trunks. Various statistical data is obtained thereby which is employed to analyze equipment operation and service quality. Conventional circuits of this type are selective only to the extent that various trunks or combinations of trunks may be connected to the observing circuit, the observer being alerted whenever a call is initiated on any of the selected trunks. In the event that calls to be monitored are interleaved on the selected trunks with calls on which observation is not desired, the observer is nevertheless alerted for all calls on the selected trunks and the unwanted calls must also be observed at least to the extent of determining their identity. In some instances there is no ready means of identifying the unwanted calls from the wanted calls by straightforward observation. Consequently, in such cases the observed data cannot be correlated properly with the calls and the efficiency of the observing operator is necessarily impaired.

Accordingly, a specific object of the invention is to increase the selectivity of service observing circuits. A related object is to increase the number of calls of a preselected type that can be monitored by a service observer.

These and other objects of the invention are attained by a service observing circuit that alerts the service observer only on calls initiated on a preselected trunk or trunks which calls are directed to one or more preselected points in the connecting telephone network. Calls which are routed on the preselected trunks to ultimate destinations other than those that are preselected are disregarded by a service observing circuit embodying the principles of the invention and, accordingly, the service observer is able to concentrate full attention on the calls that are to be monitored without interference from other calls on the selected trunks.

More specifically, a service observing circuit in accordance with the invention includes means for storing numerical indications which correspond to the directory numbers of the ultimate destinations of the calls to be monitored. The signal address of each call in terms of dial pulses or sender outpulsing which appears on a monitored trunk is automatically compared with the stored indications and a match is required to generate an alerting signal for the observer.

In accordance with another aspect of the invention, the storing and comparing arrangement described is combined with a means for alerting the service observer to all calls appearing on selected trunks without recourse to the storing and matching operations whenever such trunks terminate directly at the preselected ultimate destination of calls on which observation is desired.

An illustrative application for a circuit embodying the principles of the invention is in the monitoring of calls which terminate at a PBX attendant's station. The circuit may be located at a central switching point, such as a tandem office for example. Monitoring may readily be restricted to calls made directly to the attendants of selected PBX's and calls made through the PBX's to their respective extensions, as by direct-in-dialing, for example, are automatically disregarded irrespective of the presence of such traffic on the monitored trunks.

Accordingly, one feature of the invention is a service observing circuit which restricts the observing functions to preselected calls on the basis of the ultimate destinations of those calls irrespective of the interleaving of other calls on the same trunks.

Another feature is a service observing circuit which restricts the observance of calls on a combined basis of the ultimate destingation of the calls in terms of the terminal location of selected trunks and in terms of the dial pulse or sender pulse address of such calls.

A further feature of the invention is a service observing circuit which includes means for storing indications of the ultimate destinations of calls to be observed on together with means responsive to a match between such indications and the address of calls on selected trunks for initiating the observing functions.

The principles of the invention together with additional objects and features thereof will be fully apprehended by reference to the following detailed description of an illustrative embodiment of the invention and to the appended drawing in which:

FIG. 7 is a schematic circuit diagram of a part of digit steering circuit;

Figure 8:
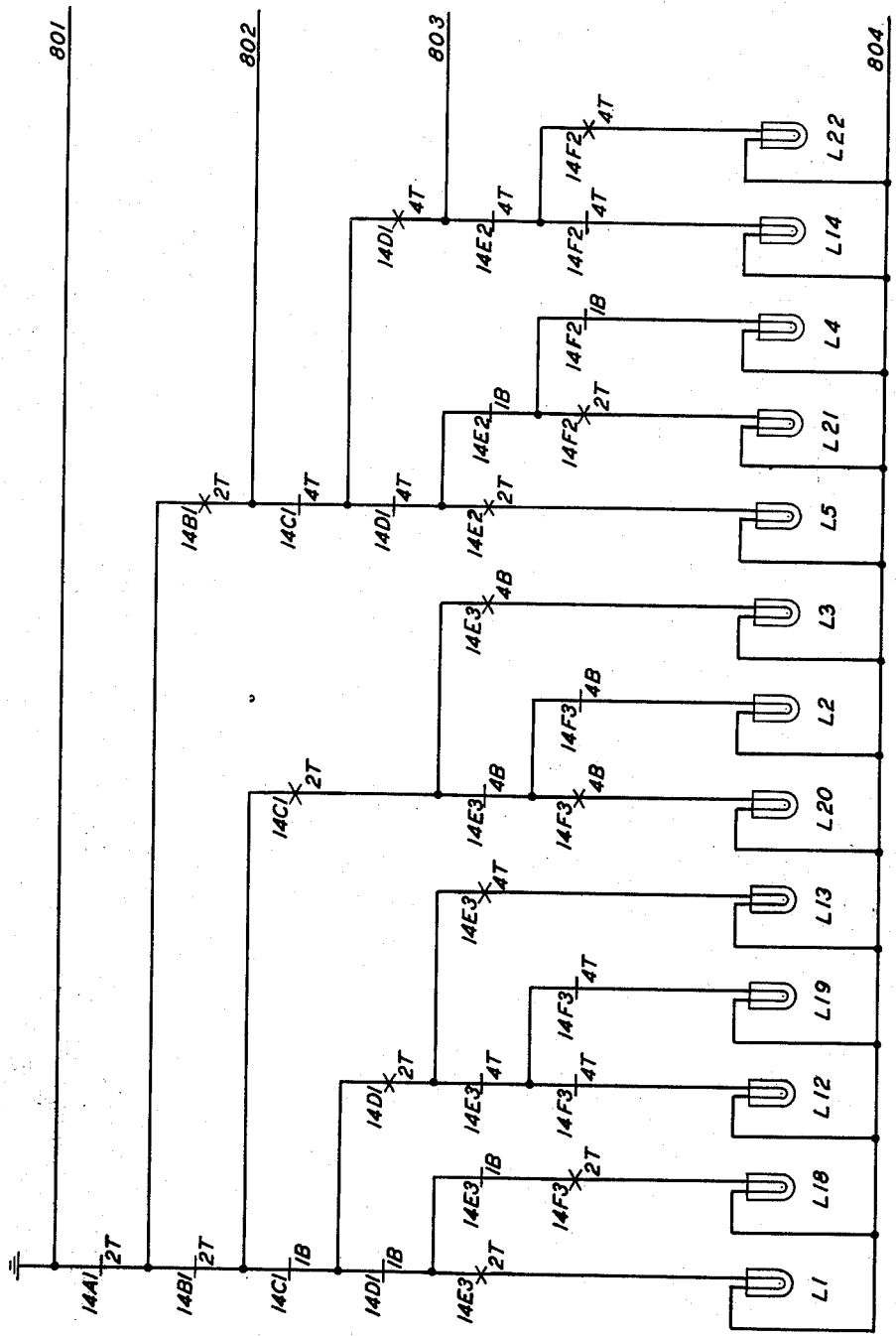
Figure 9:
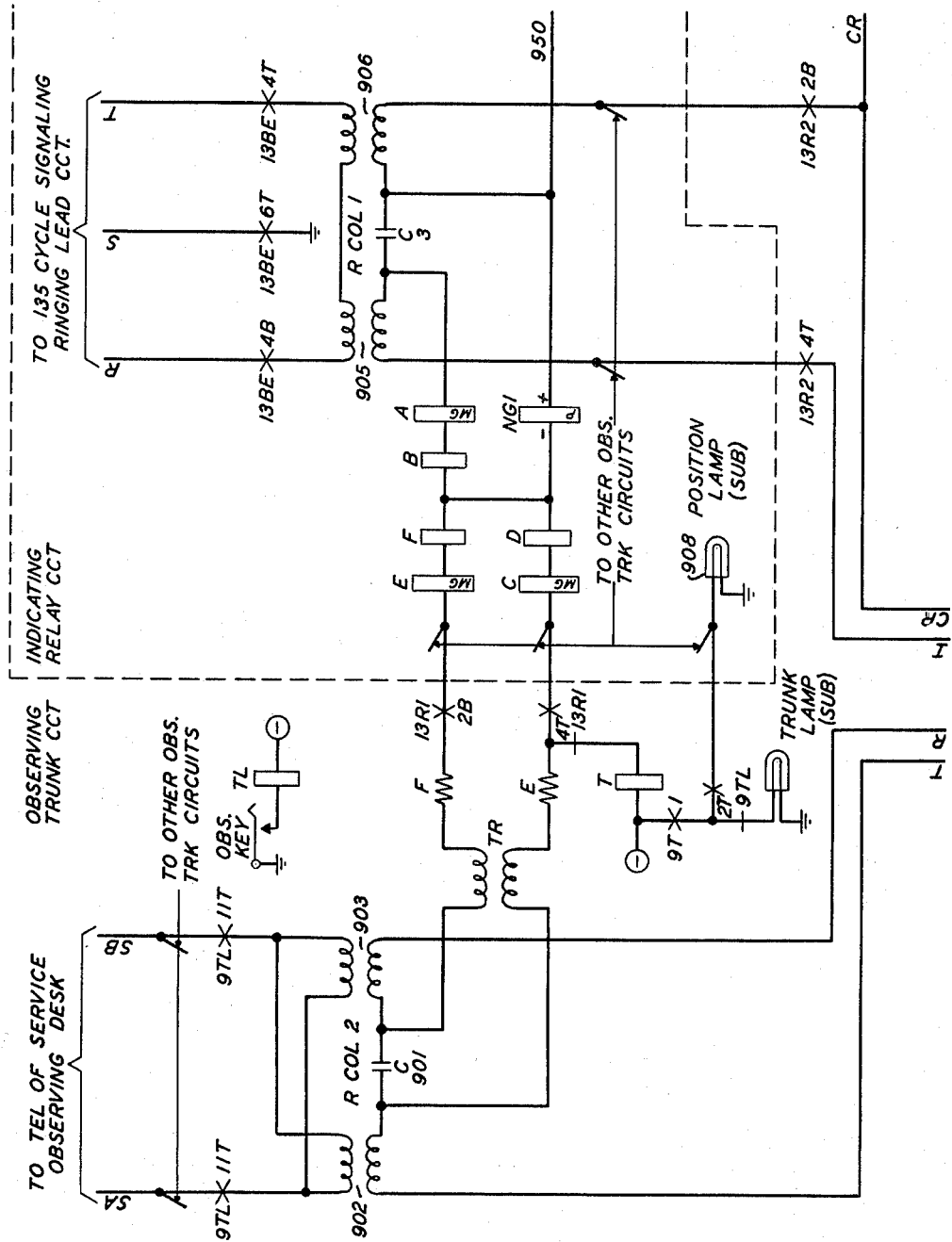
Figure 10:
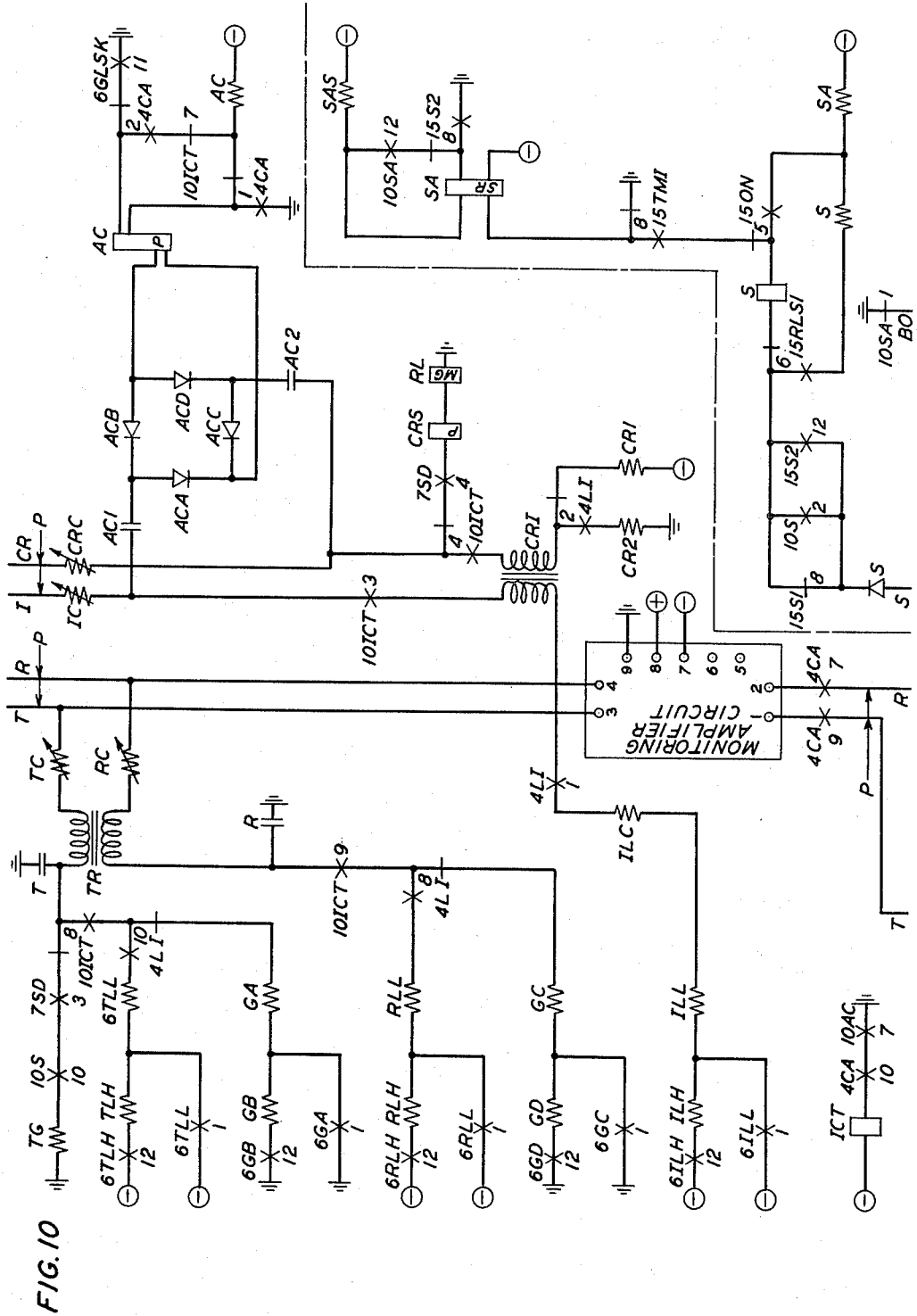
Figure 11:
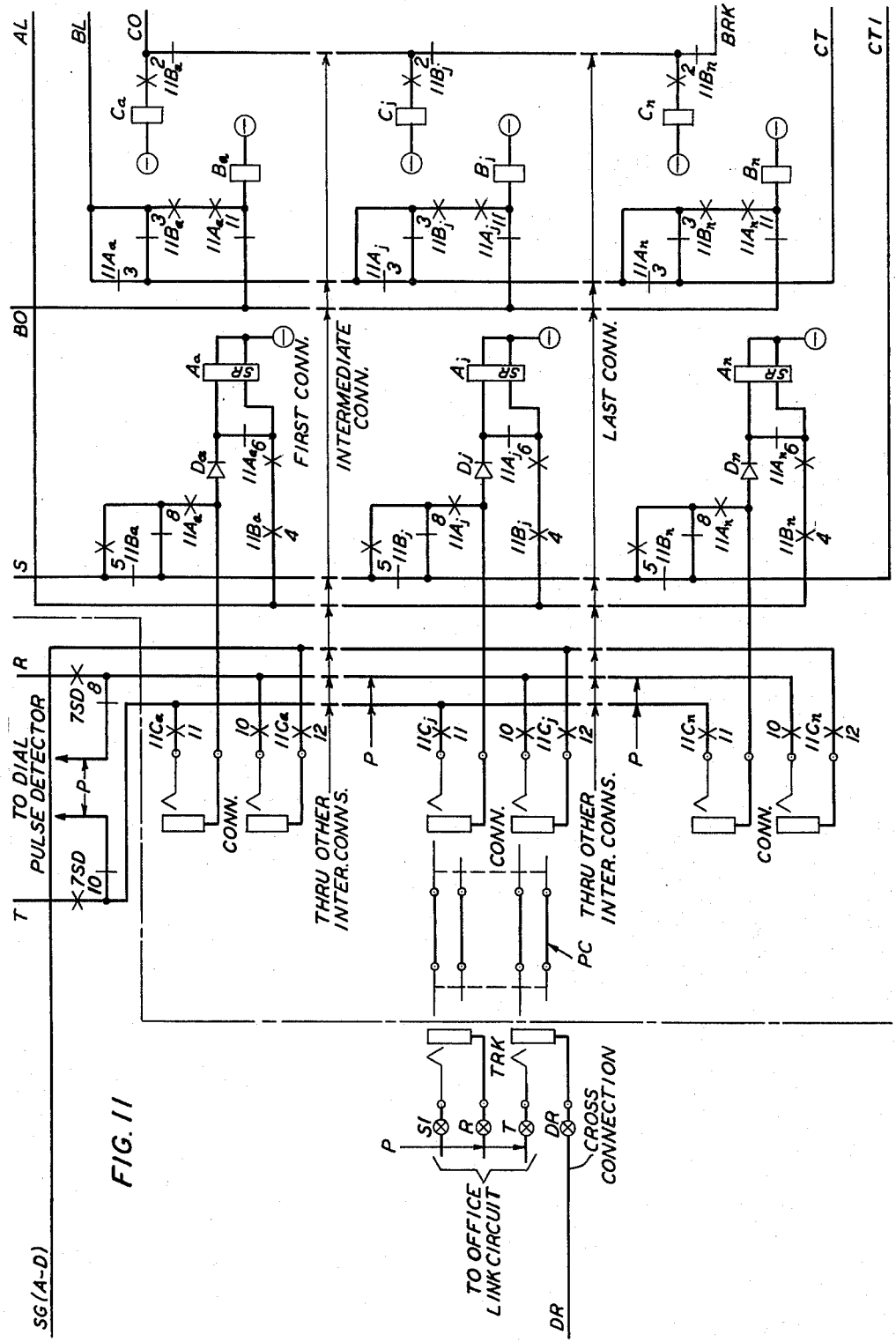
Figure 12:
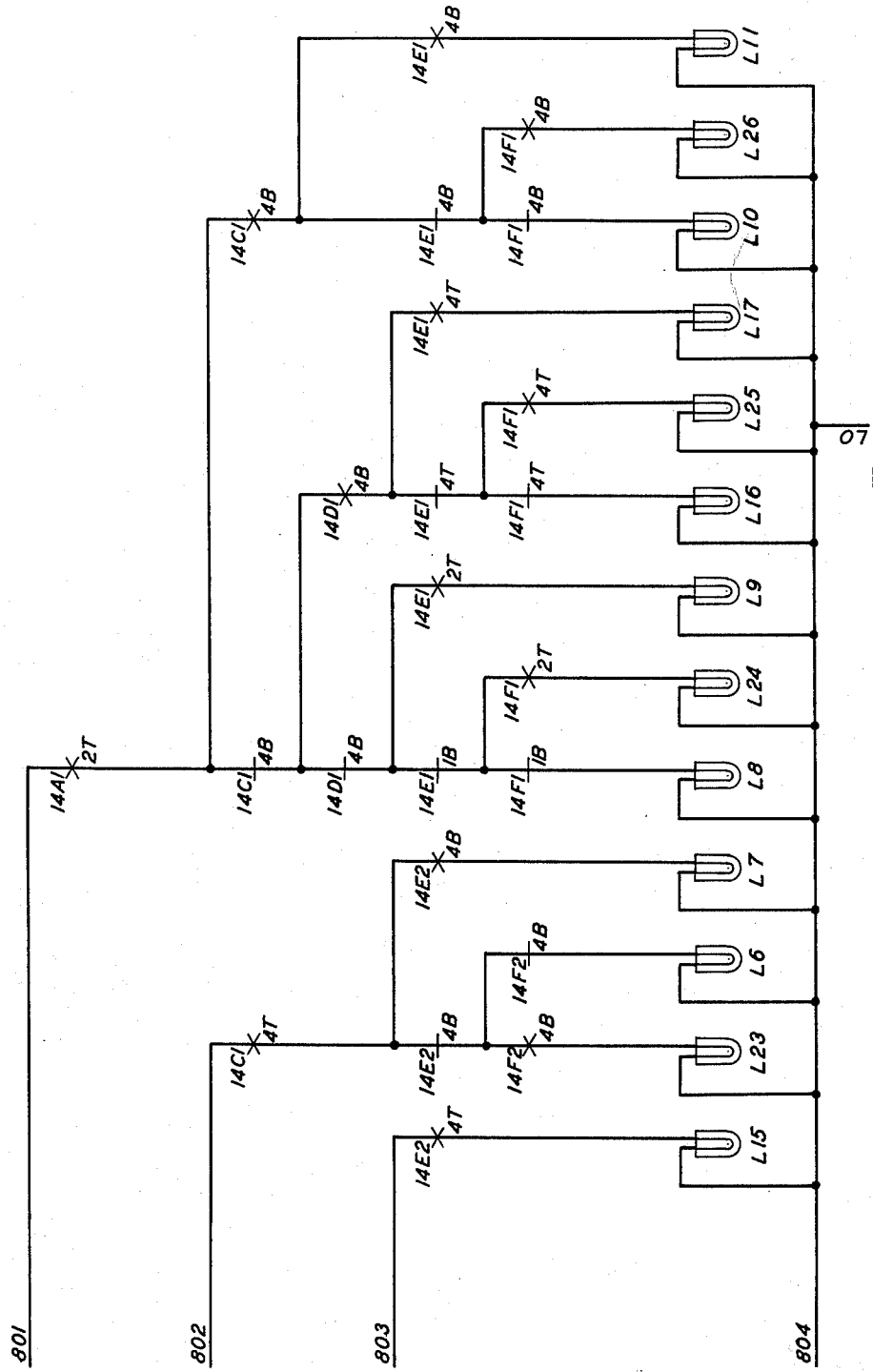

FIGS. 8 and 12 together present a schematic circuit diagram of a part of the indicating relay and lamp circuit of the observer's desk;

FIGS. 9 and 13 together present a schematic circuit diagram of the observing trunk circuit and a part of the indicating relay circuit of the observer's desk;

FIG. 10 is a schematic circuit diagram of a part of the signaling circuit;

FIGS. 11 and 15 together present a schematic circuit diagram of the trunk jack and cross connection circuit and of the connector control circuit;

FIG. 12 is a schematic circuit diagram of a part of the connector control circuit;

FIG. 14 is a schematic circuit diagram of a part of the indicating relay and lamp circuit of the observer's desk; and FIG. 16 is a block diagram of the interrelation of FIGS. 2 through 15.

Figure 1:
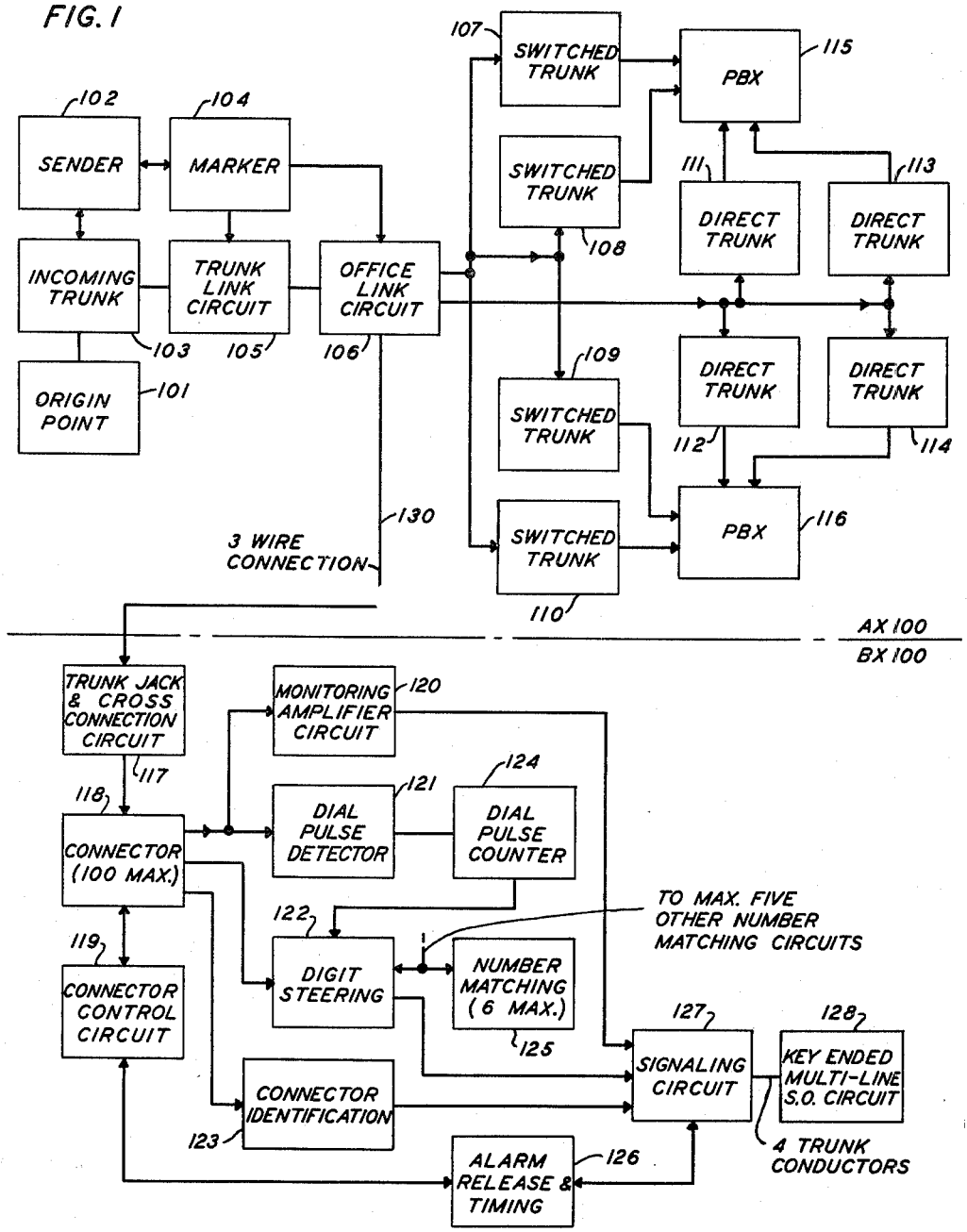
FIG. 1 is a block diagram of a service observing circuit in accordance with the invention.

In the embodiment of the invention shown in block form in FIG. 1, the principles of the invention are shown as applied to the monitoring of outgoing trunks from a conventional crossbar tandem office. Key elements of a crossbar tandem office are shown in the upper part of FIG. 1 in the area designated AX100. Although all of the equipment there illustrated is wholly conventional, it is included in order to present a complete picture of the interrelation of a service observing circuit in accordance with the invention and one illustrative type of telephone system. More specifically, equipment units of the crossbar tandem office include incoming trunk 103, sender 102, marker 104, trunk link circuit 105, and office link circuit 106. The block designated "origin point" 101 is illustrative of any connecting calling point which may be a distant central office or a subscriber's station, for example. The two PBX's 115 and 116 are intended to be illustrative of distant PBX's which are served by the crossbar tandem office having office link circuit 106. Calls may be routed to PBX 115 by switched trunks 107 and 108 or by direct trunks 111 and 113. Similarly, calls from the crossbar tandem office may reach PBX 116 by way of switched trunks 109 and 110 or by way of direct trunks 112 and 114. The function of the service observing equipment shown in the lower part of FIG. 1, designated BX100, will best be understood by tracing an illustrative operating sequence.

When a connection is to be provided by the crossbar tandem office between a distant point such as origin point 101 and PBX 115, sender circuit 102 receives the pulsed number designating PBX 115 at the time the call is placed. Sender 102, operating conventionally, signals marker 104 which operates, also conventionally, to select a trunk such as switched trunk 107 to provide a connecting path to PBX 115. Each of the trunks to PBX's 115 and 116 has its appearance on office link circuit 106 of the crossbar tandem office. The observing circuit is connected through a three-wire connection 130 to the office link appearances of the trunks to the PBX's. Specifically, the three-wire connection 130 ties the trunk jack and cross-connection circuit 117 of the observing circuit to outgoing PBX trunks 107, 108, 109, 110, 111, 112, 113, and 114. The service observing circuit also includes a maximum of one hundred connector circuits 118 which are connected to the trunk jacks of the trunk jack and cross-connection circuit 117 through patching cords in order to provide flexibility in the connection of the observing circuit to the outgoing trunks.

When marker 104 selects outgoing trunk 107, which is cross connected to trunk jack 117 of the service observing circuit, and trunk jack 117 is also suitably patched to a connector 118, the connector circuit 118 operates to cause the connector control circuit 119 to recognize the seizure of trunk 107. Marker 104, operating conventionally, gives a distinctive seizure signal which is recognized by the connector control circuit 119. This requirement for the receipt of a distinctive signal by the connector control circuit 119 prevents the seizure of outgoing PBX trunks by means other than marker 104 from causing further operation of the observing circuit. Upon receipt of the distinctive seizure signal referred to above, the connector control circuit 119 causes the appropriate connector circuit 118 to close through the leads from outgoing trunk 107 to the dial pulse detector circuit 121. At the same time, the connector circuit 118 also causes the number assigned to the seized connector to be registered in the connector identification circuit 123 and further causes the digit steering circuit 122 to be primed for the receipt of the number of digits to be outpulsed on the observed trunk 107 by sender 102.

When sender 102 receives an indication that the connection to the outgoing switched trunk 107 is set up, it proceeds, in conventional fashion, to dial out-pulse the number to PBX 115. This out-pulsing is detected by dial pulse detector circuit 121, and the pulses are counted by dial pulse counter 124. During the interdigital interval, leads to the number matching circuits 125 are grounded by relays in the digit steering circuit 122, thereby causing operation of matching relays in the number matching circuits 125 whenever the number of the grounded leads corresponds to the number set on any of certain switches that have been appropriately preset.

Following the receipt of the last digit, digit steering circuit 122 operates to cause signaling circuit 127 to transmit a signal to alert the observing operator if the number outpulsed by sender 102 matches one of the numbers set on one of the sets of number-matching switches in number matching circuit 125. In the absence of such a match, release circuit 126 operates to release the connection from the outgoing trunk. In the event of a match, however, the observer at the service observing desk 128 is signaled, and a transmission path is closed through to enable the observer to monitor the call.

To enable the observer to identify the trunk being observed, a key circuit is provided at the service observing desk 128 which, when operated, causes signaling circuit 127 to transmit to the service observing desk 128 the connector identification number that is registered in the connector identification circuit 123.

At the conclusion of the observation, the observer operates a key which initiates the generation of an appropriate signal to the signaling circuit 127 which causes the alarm, release and timing circuit 126 to effect the release of the observing circuit from the monitored trunk.

An alternate but similar operating sequence takes place if the call to be observed is on a direct trunk such as trunk 111 rather than on a switched trunk such as trunk 107. If, at the time when digit steering circuit 122 is primed with the number of digits that are to be outpulsed by sender 102, digit steering circuit 122 receives an indication of the seizure of a direct trunk to a PBX attendant, signaling circuit 127 then immediately transmits an appropriate signal to the observing operator. Dial pulse detector circuit 121 and dial pulse counter circuit 124 are automatically eliminated from the normal sequence of operations since there is no out-pulsing on direct trunks by sender 102. With this exception, the observing circuit then functions as previously described to permit the observer to monitor on a direct trunk to identify the trunk being observed upon and to release the connection at the conclusion of the observation.

As a preface to a description of the operation of the illustrative embodiment of the invention in terms of the detailed schematic circuit diagrams shown in FIGS. 2 through 16, the following tabulation is set forth to indicate the scheme of relay designations employed.

RELAYS

| Designation: | Meaning |
| --- | --- |
| A | Tradiational designation. |
| AC | Alternating Current. |
| ALM | Alarm. |
| B | Traditional designation. |
| C | Traditional designation. |
| CA | Call Accepted. |
| CRS | Common Return Sensitive. |
| CW | Call Waiting. |
| GA | Group A. |
| GB | Group B. |
| GC | Group C. |
| GD | Group D. |
| GLSK | Group Loop Steering Check. |
| HS | Hundred Steering. |
| HS1 | Hundred Steering auxiliary. |
| ICT | Indicate Cut Through. |
| ILB | I Lead Blank. |
| ILH | I Lead High. |
| ILL | I Lead Low. |
| LI | Lead Indication. |
| MB | Make Busy. |
| MH | Match Hundreds. |
| MNBR | Match Number. |
| MPN | Match Pulsed Number. |
| MT | Match Tens. |
| MTH | Match Thousands. |
| MU | Match Units. |
| NM | No Match. |
| ON | Off Normal. |

Two or more relays bearing the same capital letter designations as one of the designations of the foregoing list are distinguished by a following numeral or lower case letter designation. Other circuit components associated directly with particular relays bear similar designations.

Conventional detached-contact notation for relays has been employed throughout. Each contact is identified by a number-letter-number combination such as 6GLSK-10 in which 6 is the figure of the drawing in which the associated relay is shown, GLSK is the designation of the associated relay and 10 is the numerical designation of the contact. Normally closed contacts (break) are designated by a bar (−) and normally open contacts (make) are designated by a cross (X).

Connection of trunk circuits for observation

As indicated in FIG. 1 and as shown in detail in FIG. 11, a 3-wire cross connection is employed to connect the terminal punchings T, R and S1 of the trunk jack TRK to the office link appearances of the outgoing trunks on which service observations are to be made. Any number of trunks may be so cross connected each to a respective trunk jack, trunk jack TRK being illustrative of a single trunk connection.

Trunk jack TRK is patched by means of a patching cord PC to the connector jack CONN of the connector circuit. There may be a maximum of 100 of such connector jacks, three of which are shown, and each is associated with a corresponding connector circuit. A first, intermediate and last connector circuit are shown. Each connector circuit includes a respective group of three relays, A, B, and C, and a diode D. When the circuit is initially placed into operation, relays TM and TM1 of FIG. 15 are operated. Relay B in each of the connector circuits of FIG. 11 is operated over a path from battery, through the winding of relay Ba, for example, break contact 11Aa-11, through break contact 10SA-1 (FIG. 10) and thence to ground. This alignment places the circuit in an awaiting-call condition.

Seizure

When the seizure of a trunk causes lead S1 of that trunk to be grounded and the seized trunk is connected for observation, ground is extended through the three-wire cross connection of FIG. 11 to terminal S1 of the trunk jack TRK, through patching cord PC to the sleeve of the connector jack CONN, through diode Da, for example, to the primary winding of relay Aa and also through break contact 11Aa-6 to the secondary winding of relay Aa, thereby causing relay Aa to operate. The operation of relay Aa removes ground from its secondary winding by opening its break contact 11Aa-6. With the circuit in the awaiting-call condition, that is, relay B operated in all connectors having normal A relays and the TM and TM1 relays operated, the closure of make contact 11Aa-8 extends the ground through make contact 11Ba-5, through break contact 11Aa-8 and make contact 11Ba-5 in any lower numbered connector circuit, thereby further extending ground on the S lead through diode S of FIG. 10, break contact 15S1-8, break contact 15RLS1-6, through the winding of relay S, break contact 15ON-5 and make contact 15TM1-8 to the primary winding of relay SA and thence to battery. The completion of the path described causes the operation of relays S and SA in series.

The operation of relay Aa of FIG. 11 also locks operated relay Ba through a path defined by make contact 11Aa-11, make contact 11Ba-3, break contact 11Aa-3 or break contact 3 of relay B of any lower numbered connector, such as 11Bn-3, lead BL, and thence to the ground shown in FIG. 15. The operation of relay Aa, Aj, or An in any of the connector circuits of FIG. 11 also opens its break contact 8, thus preventing the operation of any higher numbered relay A from extending ground from the S1 lead to the S lead. Call priority is automatically established thereby.

The operation of relay Aa also causes relay TM of FIG. 15 to release by opening break contacts 11Aa-3 and 11Aa-8 through which relay TM operates. Release of relay TM opens make contact 15TM-6 (FIG. 15) causing the slow release of relay TM1.

When relay SA (FIG. 10) operates, it removes ground from the B relays of all connectors except that one in the seized connector which is locked operated by its associated A relay. Operated relay SA also provides a shunt on its secondary winding through make contact 10SA-12 and through break contact 15S2-8.

When relay S (FIG. 10) operates, it provides a ground on the AL lead shown in FIG. 11 to lock operated relay A of the seized connector which may be relay Aa, for example. The locking circuit may be traced from battery through the secondary winding of relay Aa in FIG. 11, make contact 11Aa-6, make contact 11Ba-4 to the AL lead and thence through make contact 10S-12 (FIG. 15) to ground.

Operated relay S (FIG. 10) also operates relay S1 (FIG. 15) through a path from battery through the winding of relay S1, break contact 15S1-6, break contact 15S2-10, make contact 10S-4, break contact 6GLSK-10 and make contact 15TM1-10 to ground. Relay S operating also parallels break contact 15S1-8 (FIG. 10) with make contact 10S-2 to prevent relay S from releasing when relay S1 operates since break contact 15S1-8 is included in the operating path of relay S.

Relay S1 (FIG. 15) in operating locks itself operated through its make contact 15S1-6 to ground. It also provides a circuit which includes its own make contact 15S1-12 to parallel make contact 10S-12 to maintain ground on lead AL which serves to hold relay A of the seized connector operated.

If the seizure of the trunk, which in turn caused the seizure of the connector circuit as described, is the result of a marker circuit having selected the trunk for a call, ground on the S1 lead of the trunk is removed for 3 to 13 milliseconds while the marker circuit makes a conventional double connection test on the trunk. Upon the removal of ground from lead S1 relay S (FIG. 10), which is operated to this ground, necessarily releases.

The release of relay S opens its holding path by opening its make contact 10S-2. The release of relay S also provides an operating path for relay S2 (FIG. 15) through a circuit extending from battery through the winding of relay S2, through the operated make contact 15TM1-6, break contact 15S2-6, make contact 15S1-10, break contact 10S-8, break contact 6GLSK-10 and make contact 15TM1-10.

The operation of relay S2 removes the shunt from the secondary winding of relay SA (FIG. 10) by opening break contact 15S2-8 and on a continuity basis provides a holding circuit on the secondary winding of relay SA from ground through make contact 15S2-8 and through the secondary winding of relay SA to battery through resistor SAS.

Relay S2 operating also recloses an operating circuit for relay S by closing its make contact 10SA-12 (FIG. 10) which is in parallel with make contact 10S-2 and break contact 15S1-8. This opening and closing of the operate circuit for relay S during the operating time of relay S2 is to ensure that relay S is relased for a sufficient time to allow for the operation of relay S2. At the end of its double connection test the marker again grounds trunk lead S1 which extends ground to the S1 lead of trunk jack TRK (FIG. 11), and once again relay S (FIG. 10) operates over the path previously described with the exception that the circuit extends through make contact 15S2-12 instead of through break contact 15S1-8. The operation of relay S again establishes a holding path by way of its make contact 10S-2 in order to prevent its release when make contact 15S2-12 opens upon the release of relay S2. This particular aspect of the operation is to be described subsequently in greater detail.

Operated relay S also operates relay ON (FIG. 15) through a circuit which may be traced from battery, through the winding of relay ON, break contact 15ON-6, make contact 15S2–10, make contact 10S–4, break contact 6GLSK–10 and make contact 15TM1–10 to ground.

The operation of relay ON provides a ground through its make contact 15ON–11 to lead CO which extends (FIG. 11) through break contact 2 of the B relay of any lower numbered connector, such as 11Bj–2, through make contact 11Ba–2 in the seized connector, to the winding of relay Ca in the seized connector to battery, thus causing connector relay Ca to operate.

Relay ON operating also removes the primary winding of relay SA (FIG. 10) from the series circuit with relay S by the opening of break contact 15ON–5 and on a continuity basis provides battery through resistor SA and make contact 16ON–5 to the winding of relay S to hold relay S operated when relay TM1 releases and supplies ground through its own break contact 8 to hold relay SA on its primary winding.

*False seizure*

If the trunk circuit that is connected for observation as described above is seized by other than a marker circuit, such seizure is automatically recognized by the service observing circuit, the trunk is released, and the observing circuit is returned to the awaiting-call condition. Such recognition stems from the fact that seizures by other than the marker circuit are not accompanied by the momentary removal of ground from the trunk lead 51 that conventionally identifies a marker circuit double connection test. Specifically, if such an opening and closure of ground on the S1 lead (FIG. 11) is not detected by the operation, release and reoperation of relay S (FIG. 10), relay ON (FIG. 15) cannot be operated within the release time of relay TM1 (FIG. 15) inasmuch as relay TM1 starts to release immediately after the operation of connector relay A. Thus, if relay TM1 should fully release before relay ON operates, the release circuit 126 (FIG. 1) is alerted and operates to effect the release of the observing circuit and to return it once again to the awaiting-call condition. Details of the alarm, release and timing circuit 126 of FIG. 1 are not presented herein since such circuits are conventional and are included in a number of known service observing circuits. The circuit disclosed in Patent 2,709,722, issued to V. E. Rosene on May 31, 1955 is illustrative.

*Connector identification number registration and sender circuit outpulsing information registration*

Figure 6:
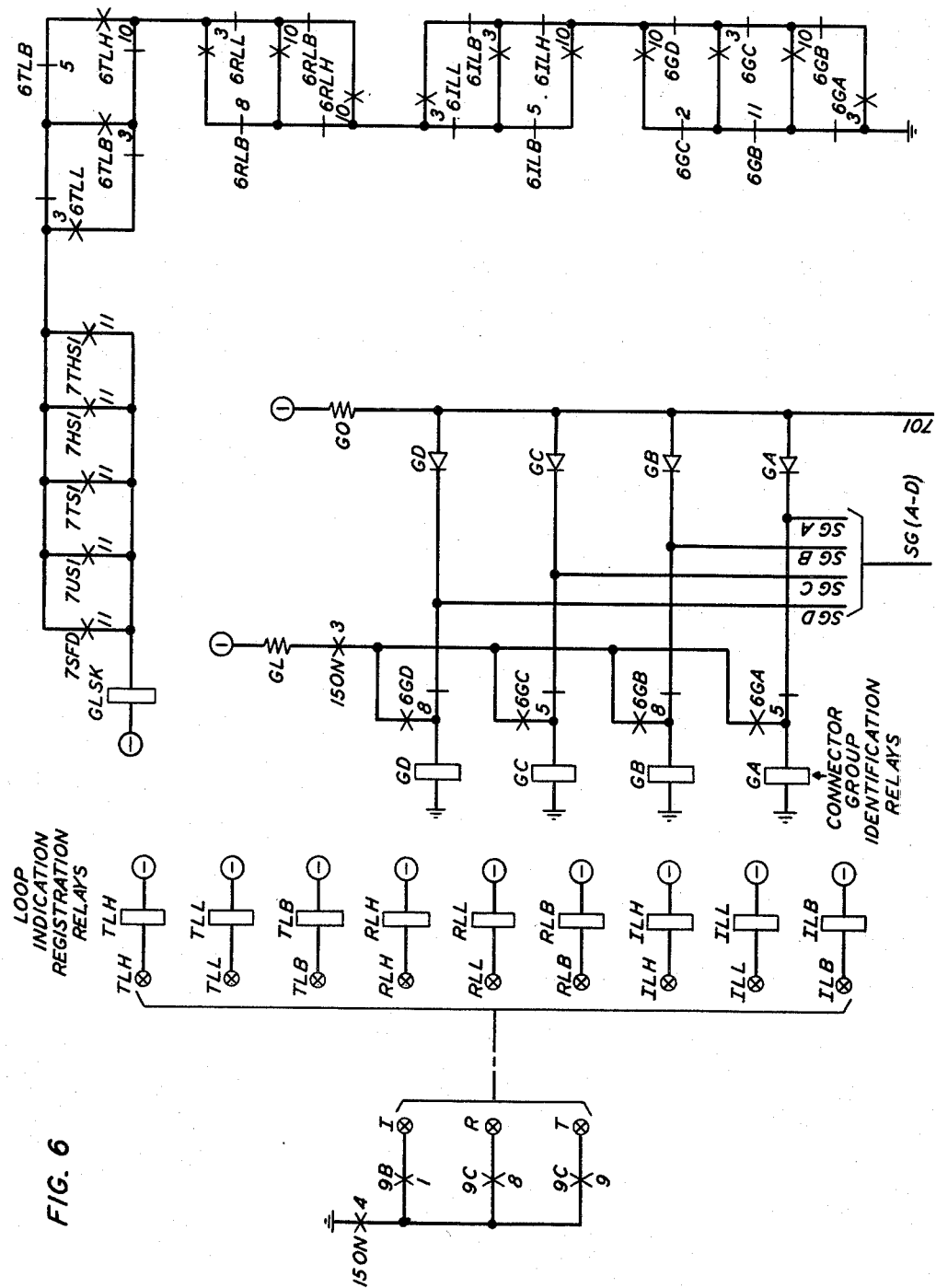
FIG. 6 is a schematic circuit diagram of the connector identification circuit.
Figure 7:
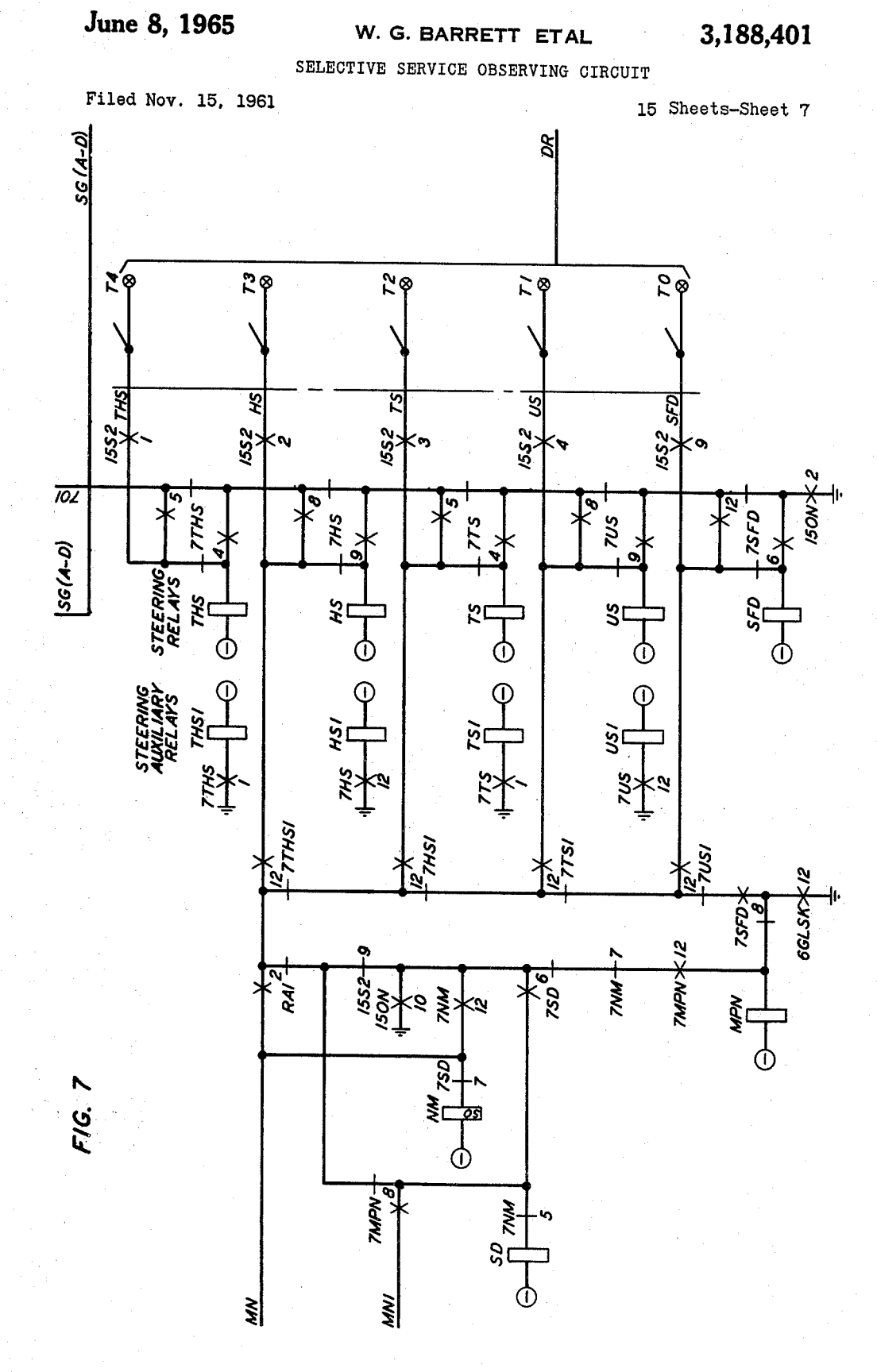

In order to prepare the digit steering circuit, FIG. 7, for the receipt of the expected number of digits, a cross connection is provided for each of the trunk jacks TRK of FIG. 11. The cross connection employs a single lead DR which is cross connected from the terminal DR to that one of the terminals T0 to T4 (FIG. 7) which corresponds to the number of digits that are to be outpulsed by the tandem office sender circuit 102 (FIG. 1) on the trunk on which observations are to be made. In order to provide for the identification of a maximum of 100 connectors the connector designating scheme employs one letter in the group A to D and a number in the group 1 to 25. In order to obtain the 25 different indications for the connectors in each letter group, each of the connector terminals I, R, and T of FIG. 6 is cross connected to any one of three other cross-connection terminals shown in FIG. 6. Specifically, terminal T is cross connected to one of the terminals TLH, TLL, or TLB, terminal R to one of the terminals RLH, RLL, or RLB, and terminal I to one of the terminals ILH, ILL, or ILB in a combination which represents the number of the connector.

Necessary conducting paths are established by the operation of relay ON, previously described, which provides a ground through its make contact 15ON–4 (FIG. 6) to lead LG to all of the connectors, as indicated, and through make contact 9C–9 (FIG. 6) to terminal T, through make contact 9C–8 to terminal R, and through make contact 9B–1 to terminal I of the seized connector, thus operating one of the relays TLH, TLL, or TLB, one of the relays RLH, RLL, or RLB, and one of the relays ILH, ILL, or ILB to which the terminals of the connector are cross connected.

The appropriate identifying combination of connector group identification relays of FIG. 6 and steering circuit relays of FIG. 7 are in effect operated through a common circuit. The operation of connector relay C (FIG. 9) extends ground through make contact 15ON–2 (FIG. 7), through the chain of normal steering relays by way of break contact 7SFD–12, break contact 7US–8, break contact 7TS–5, break contact 7HS–8, break contact 7THS–5, lead 701 to diodes GA, GS, GC, and GD shown in FIG. 6 and thence on the SGA, SGB, SGC, or SGD lead, depending upon which group includes the seized connector, to make contact 11Ca–12 (FIG. 11) of the seized connector and finally to the sleeve of the connector jack CONN. Patching cord PC further extends this ground to the sleeve of trunk jack TRK which is connected to terminal DR. As previously noted, terminal DR is cross connected to one of the terminals T0 to T4 shown in FIG. 2. Depending upon the terminal of the group T0 to T4 that is cross connected to terminal DR, ground is further extended on the THS, HS, TS, US, or SFD lead (FIG. 7) to operate an associated one of the steering relays THS, HS, TS, US, and SFD. More specifically, if terminal DR (FIG. 11) is cross connected to terminal T4 (FIG. 7), ground is extended on lead THS through make contact 15S2–1 and break contact 7THS–4 to the winding of relay THS to battery. The completion of this conducting path results in the operation of steering relay THS.

The same ground that operates the steering relay, as described, also prevents the connector group identification registration relay GA through GD from operating in series with the steering relay by providing a shunting ground to the winding of the appropriate connector group identification relay (FIG. 6). This circuit may be traced from ground through make contact 15ON–2 (FIG. 7), break contact 7SD–12, break contact 7US–8, break contact 7TS–5, break contact 7HS–8, and break contact 7THS–5 to the diodes GA–GD. Assuming relay GA is to be shunted, ground is then extended through break contact 6GA–5 to the winding of relay GA to ground.

When the appropriate steering relay of FIG. 7 operates, it removes the shunting ground to diodes GA–GD (FIG. 6). On a continuity contact basis, i.e., break and make contacts 7THS–5 and 7TS–5 in the case of relays THS and TS, or break and make contacts 7HS–8 and 7US–8 in the case of relays HS and US, or break and make contacts 7SFD–12 in the case of relay SFD, a conducting path is closed from battery through resistor GO, through the aforementioned make contact of the steering relay that is operated to the lead over which the steering relay of FIG. 7 had operated, through the DR cross connection (FIG. 11), through connector patch cord PC and make contact 11Cj–12 and thence on the SGA to SGD lead corresponding to the group in which the seized connector is located to the winding of the GA–GD relay of FIG. 6 and finally to ground.

The one relay GA–GD that operates locks through its own make contact 5 in the case of relays GA and GC, or make contact 8 in the case of relays GB and GD to make contact 15ON–3 and through resistor GL to battery. The steering relay that operates locks through make contact 7THS–4 or 7TS–4 in the case of relays THS and TS, or make contact 7HS–9 or 7US–9 in the case of relays HS and US, or make contact 7SFD–6 in the case of relay SFD, and thence to ground through make contact 15ON–2. This method of operating a steering relay (FIG. 6) and a connector group identification relay (FIG. 7) permits the operation of both relays over the same lead, and at the same time allows them to lock independently of each other.

The combined operation of one of the connector group identification relays, one of the relays TLH, TLL, or TLB, one of the relays RLH, RLL, or RLB, one of the relays ILH, ILL, or ILB and one of the steering auxiliary relays THS1, HS1, TS1, US1, OR SFD, provides an obvious operating path for relay GLSK (FIG. 6). The operation of relay GLSK serves as a check that the information indicated has been received through the connector.

*Observation on a trunk on which the sender circuit outpulses to the distant office*

The operation of relay GLSK operates relay MPN (FIG. 7) provided that relay SFD (FIG. 7) has not been operated as the steering relay. The circuit for the operation of relay MPN is through break contact 7SFD-8 and make contact 6GLSK-12 to ground. Relay MPN locks operated through its own make contact 7MPN-12, break contact 7NM-7, break contact 7SD-6, and make contact 15ON-10 to ground. The operation of relay MPN prepares dial pulse detector circuit 121 (FIG. 1) and dial pulse counting circuit 124 (FIG. 1) for operation. These circuits are wholly conventional and may take any one of a variety of circuit forms well known in the art. Consequently, circuit details are not shown herein.

Figure 2:
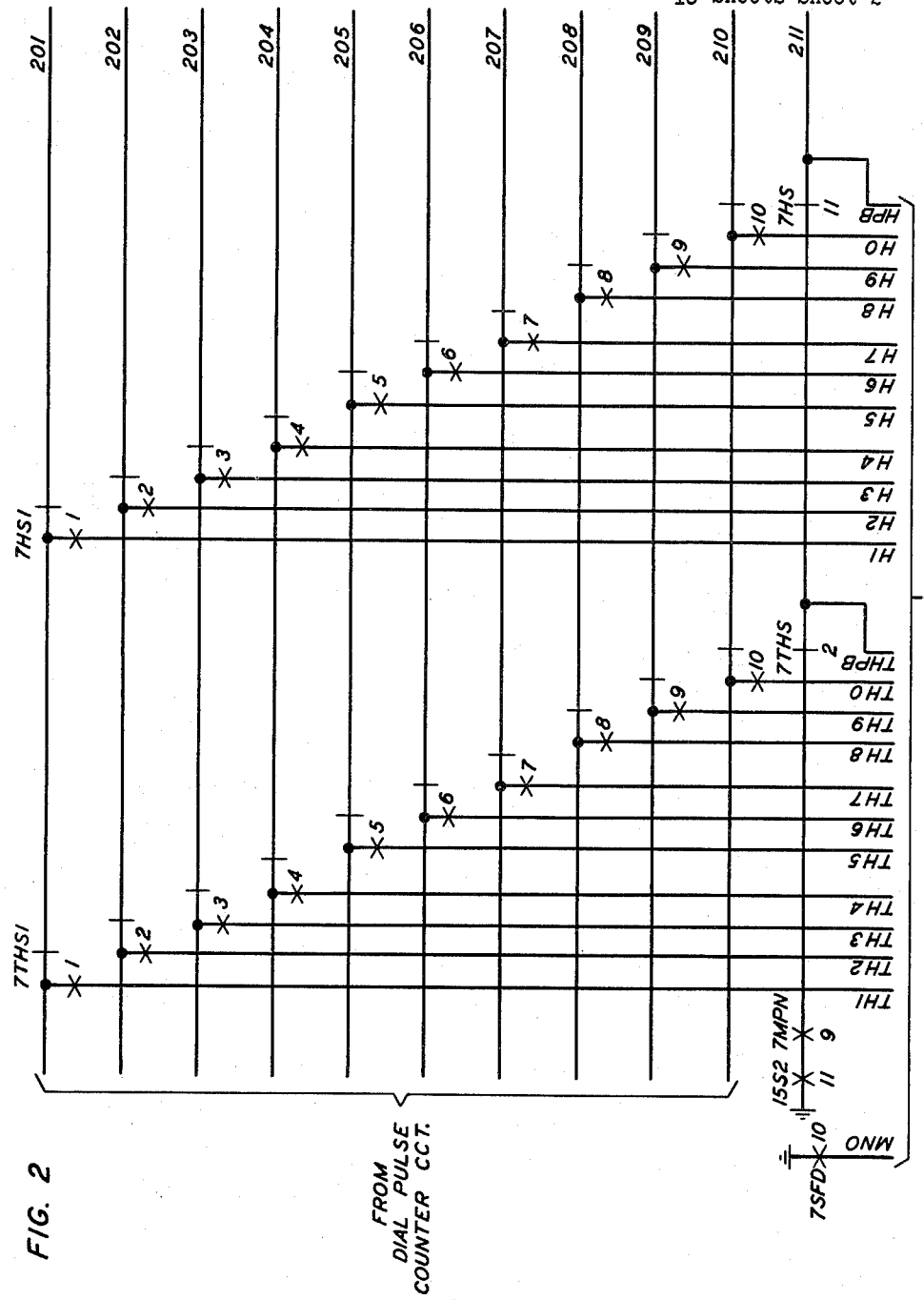
FIG. 2 is a schematic circuit diagram of a part of the digit steering circuit.
Figure 3:
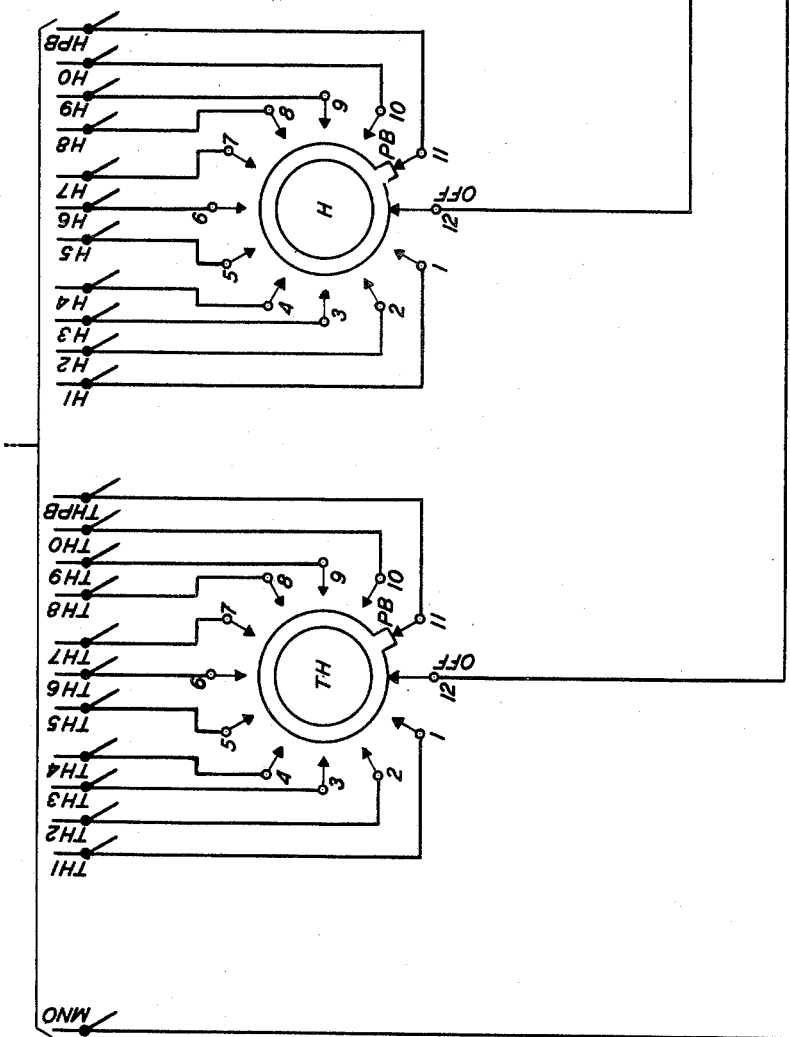
FIG. 3 is a schematic circuit diagram of a part of the number matching circuit.
Figure 4:
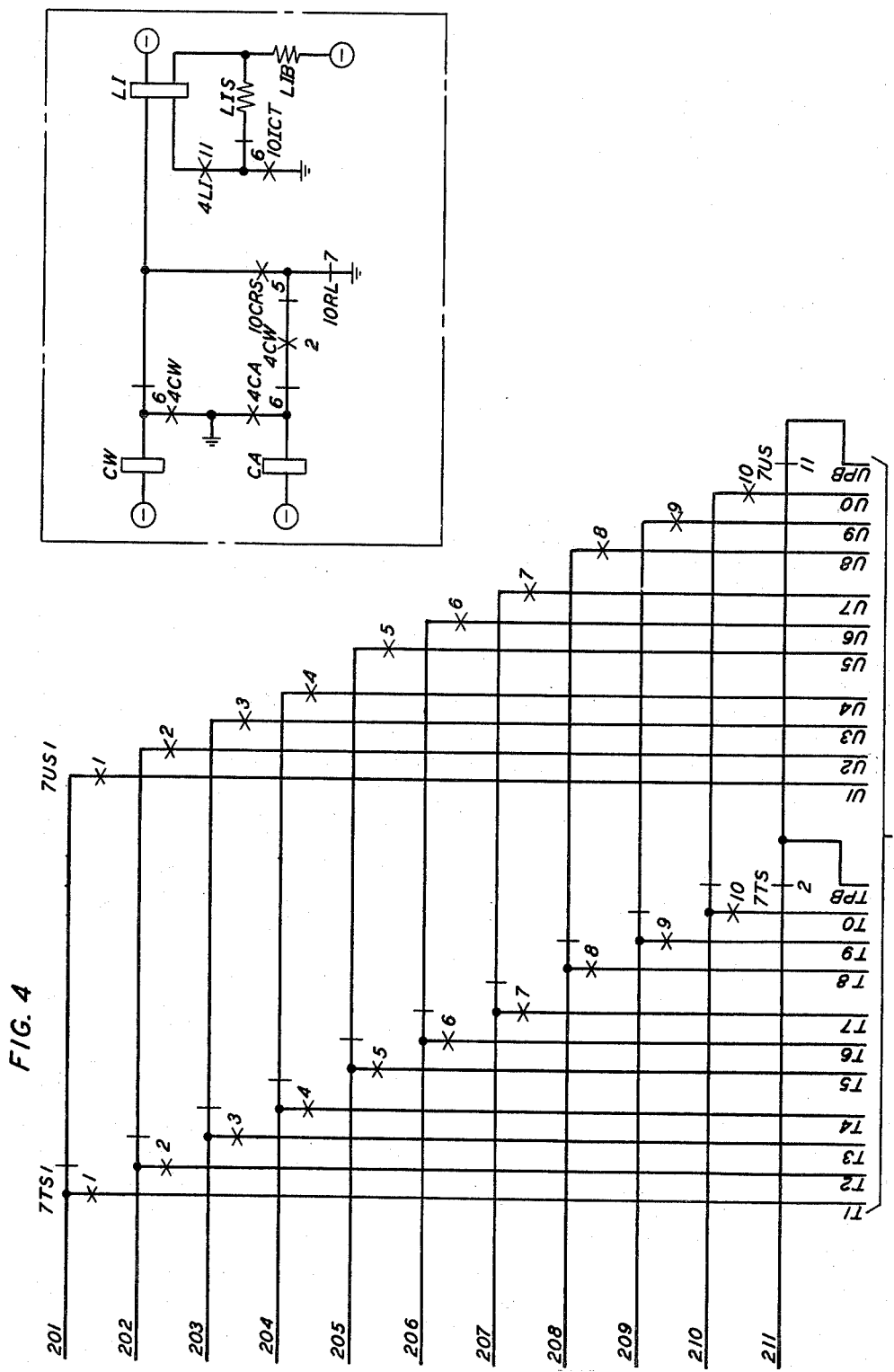
FIG. 4 is a schematic circuit diagram of a part of the digit steering circuit and, in the inset, a schematic circuit digram of a part of the signaling circuit.
Figure 5:
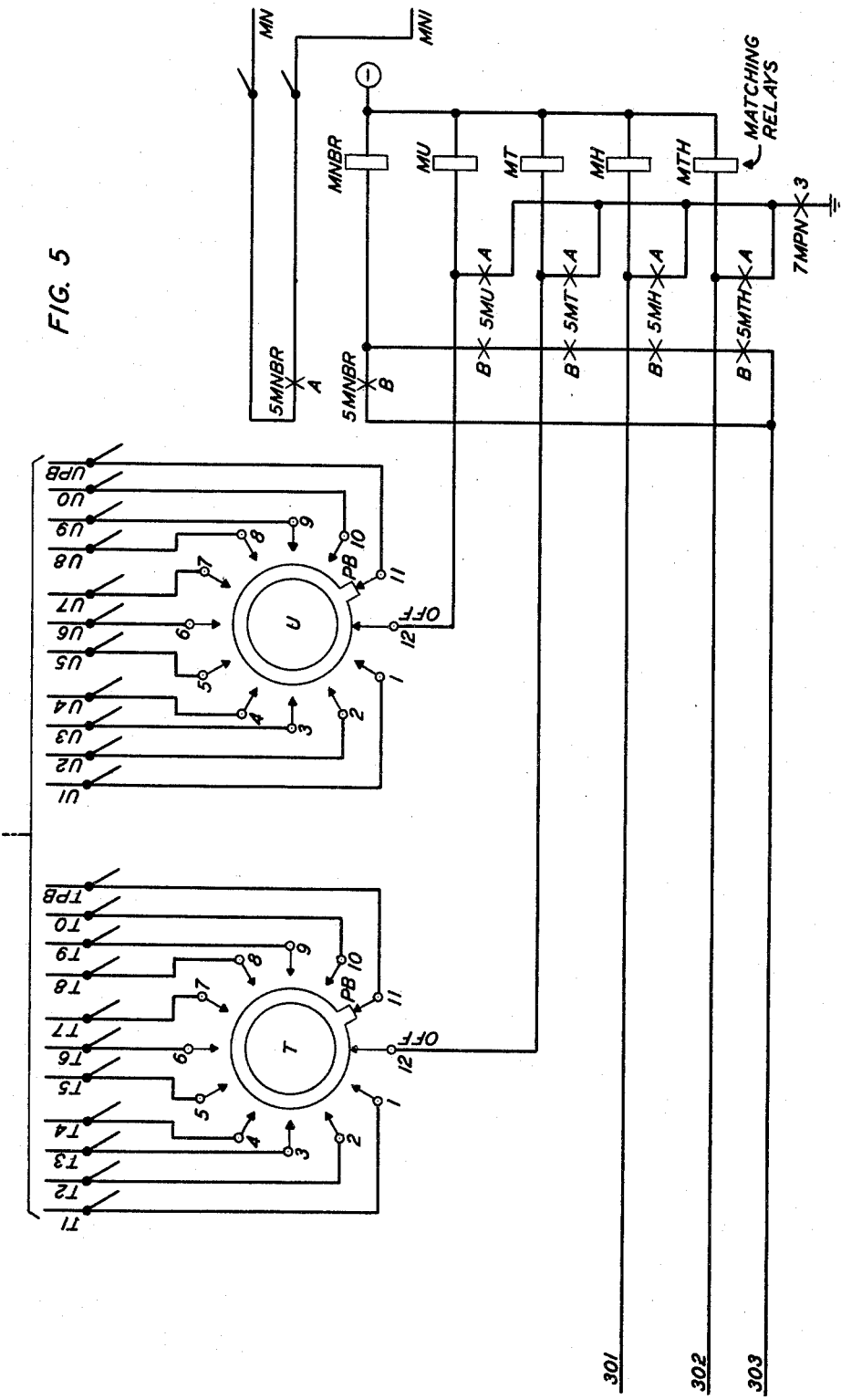
FIG. 5 is a schematic circuit diagram of a part of the number matching circuit.

Additionally, relay MPN operated extends ground from make contact 15S2-11 (FIG. 2), through make contact 7MPN-9 and through the chain of normal contacts of the steering relays in order to ground the PB leads to the number matching circuits shown in FIGS. 3 and 5. Considering an illustrative case with relay HS as the operated steering relay, ground is extended through break contact 7THS-2 only to lead THPB since the operated HS relay opens the circuit to subsequent PB leads and to contact PB of the TH switch (FIG. 3) in all number matching circuits. If switch TH of any of the number matching circuits is set on the PB position, relay MTH (FIG. 5) associated with that switch is provided with an operating path. In similar fashion, the matching relay associated with each of the switches H, T, or U can be operated if the associated switch is set on the PB position. The matching relays MTH, MH, MT, and MU (FIG. 5) that operate lock to ground through make contact 7MPN-3.

When the sender 102 (FIG. 1) makes conventional trunk tests on the trunk on which the observation is being made, the dial pulse detector 121 is arranged to respond by causing the operation of relay RA1 (not shown) in the dial pulse counting circuit 124. As indicated above, details of the dial pulse detector 121 and dial pulse counter 124 circuits are not shown inasmuch as their function and operation is substantially conventional. In the descriptive material that follows, however, reference will be made to relays RA and RA1 of the dial pulse counting circuit 124. Although these relays are not shown in the drawing, the conditions for operation is stated in each instance and, as indicated, their key contacts are specifically shown in relation to the other elements of the disclosed embodiment.

When the sender 102 begins outpulsing the number to the distance office, relay RA of the dial pulse counting circuit 124 is arranged to operate in response to the first pulse. Since relay TM1 of FIG. 16 has by this time fully released to open its make contact 6, the operation of relay RA releases relay S2 (FIG. 15) by opening break contact RA-9 and also releases relay RA1 of the dial pulse counting circuit in similar fashion by the opening of a break contact (not shown). The release of relay S2 opens the operating circuit of relay S (FIG. 10) by opening make contact 15S2-12. Under this condition relay S, which is being held operated to the trunk S1 lead ground, cannot be reoperated once it has released.

The release of relay S2, along with the release of relay RA1, causes the operation of the succeeding steering relay. This circuit may be traced from ground through make contact 15ON-10 (FIG. 7), break contact 15S2-9, break contact RA1-2, break contact 12 of any of the steering auxiliary relays preceding the steering relay operated, through make contact 12 of the steering auxiliary relay operated, through break contact 7TS-4 in the case of relay TS, or break contact 7HS-9 or 7US-9 in the case of relays HS or US, or break contact 7SFD-6 in the case of relay SFD and thence through the associated winding of the succeeding steering relay to battery. Relay S2 releasing also removes ground from the PB leads to the number matching switches of FIGS. 3 and 5 by opening make contact 15S2-11.

Following the last pulse of the digit which is being outpulsed by the sender and during the interdigital time, relay RA of the dial pulse counter circuit is made to release, grounding a lead corresponding to the number of digits detected by the dial pulse detector circuit. This ground is extended through any preceding digit steering auxiliary relay (FIG. 7) to the digit steering auxiliary relay that is operated, thereby grounding the lead to the number matching circuits corresponding to the digit received. It is evident that if the switch corresponding to the digit that has been received is set on a position corresponding to the number of pulses of the digit, the associated match relay MTH, MH, MT, or MU (FIG. 5) will operate. Thus, for example, assume that the sender is to outpulse three digits and that the first of these three digits is coded in terms of six pulses. If, under these conditions, switch H of any of the number matching circuits is set on the six position it is clear that relay MH of the associated matching circuit would operate. The operating circuit may be traced from battery through the winding of relay MH to contact 12 (common) of matching switch H, to contact 6 of those H switches that are set in the six position, to make contact 7HS1-6 (FIG. 2) and to break contact 7THS1-6 and thence to ground on the 6 lead of the dial pulse counting circuit. Matching relay MH thus operates and locks through the circuit path described.

During the interdigital interval and after the removal of the ground that had been extended from the dial pulse counting circuit, the steering relay for the digit that had just been received is released. Subsequent digits are received and matched in the same manner with the exception that, after the first digit, relay S2 is already released and on the last digit relay SFD of FIG. 7 will be the steering relay that will operate.

*Number outpulsed by sender circuit matches the number set on one of the number matching circuits*

When relay RA of the dial pulse counting circuit releases at the end of the receipt of the last digit, relay MU in that number matching circuit where the U switch setting corresponds to the digit received will operate. Relay MU operates over an obvious path similar to that described for relay MH. If, in one of the number matching circuits, the MTH, MH, MT, and MU relays are operated as a result of the corresponding switch settings matching the number outpulsed by the sender, then relay MNBR of that matching circuit operates. The operating path of relay MNBR extends from battery through its winding, through make contact B of relays MU, MT, MH, and MTH and thence to ground by way of lead MNO and make contact 7SFD-10 (FIG. 2). Relay RA also operates relay RA1 in the dial pulse counting circuit which is arranged to effect the release of relay US (FIG. 7) and, in turn, relay US1. When relay US1 releases, it extends the ground through make contact 6GLSK-12 (FIG. 7), make contact 7SFD-8, break contact 12 of relays US1, TS1, HS1, and THS1, make contact RA1-2, and break contact 7SD-7 to the winding of relay NM and thence to battery. Ground is also extended through make contact 5MNBR-A (FIG. 5), make contact 7MPN-8 (FIG. 7), and through break contact 7NM-5 to relay SD and thence to battery. Relay NM is slow to operate and consequently relay SD operates ahead of it and prevents relay NM from operating by opening its operating path. Relay SD locks operated to a circuit which may be traced from break contact 7NM–5 to make contact 7SD–6 and thence to ground through make contact 15ON–10. Relay SD signals the observer in a manner yet to be described.

*Number outpulsed by sender circuit does not match the number set on any of the number matching circuits*

The release of relay RA of the dial pulse counter circuit following the receipt of the last digit causes the operation of relay MU (FIG. 5) in the number matching circuits as previously described. Relay US1 releases, also as described, and ground is once again extended to the winding of relay NM which slow operates since relay SD, having no operating path owing to the failure of any of the relays MNBR to operate, does not operate. Relay NM operates and locks through break contact 7SD–7, make contact 7NM–12 and make contact 15ON–10 to ground. This action results in the release of relay MPN by opening its locking circuit which in turn causes the release of any operated matching relay.

*Observation on a direct trunk*

Provisions for monitoring on a direct PBX trunk such as trunk 111 (FIG. 1) include cross-connecting terminal DR (FIG. 11) of a trunk jack such as jack TRK to terminal T0 (FIG. 7). This arrangement causes relay SFD (FIG. 7) to operate as the steering relay. This operation has been previously described. Relay SFD, operated, opens the operating circuit of relay MPN by opening break contact 7SFD–8, preventing relay MPN from operating and enabling the circuits for number matching. Relay SFD operated also provides a circuit for operating relay SD as soon as relay GLSK operates. This circuit extends from ground through make contact 6GLSK–12, through make contact 7SFD–8, through break contact 12 of relays US1, TS1, HS1 and THS1, break contact RA1–2, break contact 7MPN–8, and break contact 7NM–5 to the winding of relay SD to battery. Relay SD operates and locks to the circuit previously described. If relay TM1 (FIG. 15) has released, relay SD operating releases relay S2 by opening its break contact 15S2–12. Operation of relay SD also causes the observer to be signaled, as described below.

*Observer signaled*

The operation of relay SD, previously described, applies ground by way of leads T and CR (FIG. 9) to the desk circuit to signal the observer that an observation is to be made. Specifically, this circuit extends from ground through resistor TG (FIG. 10), make contact 10S–10, make contact 7SD–3, break contact 10ICT–8, inductor TR, through compensating resistor TC to lead T and thence to the service observing desk circuit (FIG. 9), through winding 902 of repeat coil RCOL2, inductor TR, resistor E and break contact 13R1–4T to the winding of relay T and thence to battery, thereby operating relay T. The CR lead circuit extends from ground through the windings of relays RL and CRS (FIG. 10), make contact 7SD–4, break contact 10ICT–4, and compensating resistor CRC to the CR lead and thence to the service observing desk circuit of FIG. 13 through break contact 13R2–2T and break contact 9TL–2B to the winding of relay CR and thence to battery. Relay CRS (FIG. 10) and relay CR (FIG. 13) operate in series. Relay RL (FIG. 10) does not operate on the low current circuit described.

The operation of relay T (FIG. 9) results in the lighting of the trunk lamp SUB over a circuit from battery through make contact 9T–1 and break contact 9TL–2T to the lamp and thence to ground.

The operation of relay CR (FIG. 13) lights the trunk lamp GUARD over the obvious path. The observer is thus alerted to the presence of a call on one of the monitored trunks and is also alerted to the fact that the destination of the call is within a preselected category such as that illustrated by PBX's 115 or 116 (FIG. 1).

*Observer answers signal*

If the observer responds to the alerting signal within 3 to 4 seconds by the operation of trunk key OBS, a path for the operation of relay TL is completed. The CR lead circuit (FIG. 13) is thus opened at break contact 9TL–2B which releases relay CR in the desk circuit (FIG. 13) and also relay CRS in the service observing circuit (FIG. 10).

When relay CRS is in the operated condition, relay CW (FIG. 4) is also operated over a path from battery through its winding, to break contact 4CW–6, make contact 10CRS–5, break contact 10RL–7 and thence to ground.

When relay CRS releases, relay CA (FIG. 4) operates over a path from battery through its winding to break contact 4CA–6, make contact 4CW–2, break contact 10CRS–5 and break contact 10RL–7 to ground. The operation of relay CA is employed in conventional fashion to terminate the action of the timing circuit. In the event that the observer fails to answer the signal within the 3 to 4 seconds timing period, the alarm, release and timing circuit 126 of FIG. 1 is designed to operate, resulting in the release of the trunk circuit and in the termination of signaling by the desk circuit.

Relay CA operating closes the T and R leads from the trunk being observed upon to the monitoring amplifier circuit of FIG. 10, thereby enabling the observer to monitor on the trunk connection.

*Identification of observed trunk*

To identify the circuit upon which the observation is being made, the observer operates the key INDICATE (FIG. 13) which is located at the service observing desk. The operation of the key INDICATE completes an obvious operating path for relay SR and also operates relay BE through break contacts 13LB–1B, break contacts 14LIa–9 and 13BD–1B. Relay SR operated lights an indicating pilot lamp 904 by closing a path which includes make contact 13SR–2T. Relay R2 is also operated over a circuit extending from ground through the winding of relay R2, make contact 9TL–7B, make contact 13SR–2T and thence to battery. The operation of relay R2 completes an obvious path for the operation of relay R1. The operation of relays R1 and R2 transfers the trunk circuit leads T, R, I, and CR to the indicating circuit relays of FIG. 10.

Relay BD (FIG. 13) is also operated by the operation of relay R1. The circuit involved extends from ground through make contact 13R1–2T, through the winding of relay BD, break contact 13LB–1T, and thence to battery through the operated INDICATE key. Relay BE, operated over an obvious path when the INDICATE key is closed, closes the start lead S (FIG. 9) to the 135 cycle interrupter circuit through make contact 6T and closes the T and R leads from the interrupter circuit through make contacts 13BE–4T and 13BE–4B, respectively, to repeat coil windings RCOL905 and RCOL906.

As a result, 135 cycle signaling current is applied through make contacts 4T and 2B of relay R2 to leads I and CR and thence to the signaling circuit of FIG. 10. A bridge rectifier circuit which includes diodes ACA, ACB, ACC, and ACD, shown in FIG. 10, rectifies the 135 cycle alternating current signal, applying it to polarized relay AC. The operation of relay AC in turn operates relay ICT by completing a circuit from ground through make contact 10AC–7, make contact 4CA–10 and through the winding of relay ICT to battery. The operation of relay ICT connects battery through resistor CR1, break contact 4LI–2, inductor CRI, make contact 10ICT–4, and compensating resistor CRC to lead CR.

Ground is connected to leads T or R through the previously operated group relay and associated resistors. For example, if relay GB is operated, ground is connected through its make contact 6GB-12, through resistors GB and GA, break contact 4LI-10, make contact 10ICT-8, inductor TR, and through compensating resistor TC, to the T lead. The application of battery and ground to the CR and T or R leads as described, results in the operation of an associated combination of the marginal, sensitive relays A, B, C, D, E, and F (FIG. 9).

Assuming, for example, that relay GB is operated, ground on lead T is extended through winding 902 of repeat coil RCOL2 through the lower winding of inductor TR, resistor E, make contact 13R1-4T, the winding of relay C, the winding of relay D, the winding of relay NGI, winding 906 of repeat coil RCOL1, and thence through make contact 13R2-2B to the battery on the CR lead.

The high resistance ground which is connected through resistors GA and GB (FIG. 10) causes the operation of relay D of FIG. 9. Relay C is marginal and will not operate on the high resistance circuit described and, since the service observing circuit is sending a connector group indication followed by a loop indication, as will be described, relay NGI will not operate inasmuch as it is polarized and the current flow is in the nonoperate direction. The normal NGI relay thus provides a path through its break contact to prepare for the generation of the group identification relay. If other group registration relays (FIG. 6) had been operated, the indicating circuit marginal and sensitive relays (FIG. 9) would operate in a similar manner to the grounds supplied by the operated group relays. If the group registration relay (FIG. 6) operated were relay GA or relay GC, the marginal relays (FIG. 9) of the indicating circuit would operate in series with the sensitive relays of the indicating circuit.

As a result of the combination of indicating circuit relays that are operated, one of the group indicating relays GA, GB, GC, or GD shown in FIG. 14 is operated. Assuming again, for example, that group B is the selected group, relay GB operates by virtue of a completed path extending from battery through the INDICATE key (FIG. 13), break contact 9NGI-5 (FIG. 14), the winding of relay GB, break contact 14LIa-2, make contact 9D-1 and break contact 9C-2T to ground. Similarly, the other group indicating relays operate upon the transmission of other group indications.

The group indicating relay GAa, GBa, GCa, or GDa which operates locks through one of its own make contacts through break contacts of higher group relays to a ground extended to lead 134 through make contact 13R1-2T (FIG. 13). Again using the example of relay GBa operated, the locking circuit ground may be traced from ground through make contact 13R1-2T, break contact 14GDa-10 (FIG. 14), break contact 14GCa-3 and make contact 14GBa-10 to the winding of relay GB.

The operation of relay BD (FIG. 13) described above, initiates the slow operation of relay LB through a circuit extending from battery through the operated INDICATE key, make contact 13BD-1T, the winding of relay LB and thence to ground through make contact 13R1-2T. Relay LB operated locks operated through break contact 14LIa-11, make contact 13LB-1T, and thence to battery through the INDICATE key, opening the operating circuit of relay BE which is being held by relay BD operated. The operation of relay LB starts the slow release of relay BD by opening break contact 13LB-1T through which relay BD had been operated. The release of relay BD in turn releases relay BE by opening make contact 13BD-1B through which relay BE is being held operated.

The release of relay BE opens the circuit from the 135 cycle generator circuit to repeat coil RCOL1 (FIG. 9) terminating the 135 cycle signal. Consequently, relay AC releases which in turn releases relay ICT by opening make contact 10AC-7. The release of relay ICT causes the removal of battery from lead CR and ground from lead T or R, thus permitting the operated indicating relay C, D, E, or F of FIG. 9 to release. Through break contact 10ICT-4 the ground is again connected to the CR lead through the windings of relays RL and CRS and make contact 7SD-4.

When relay BE releases, a circuit is also closed from ground through make contact 13R1-2T (FIG. 13), the winding of relay LIa (FIG. 14), break contact 14LIa-8, make contact 14GBa-11, break contact 13BE-1T, make contact 13LB-1B to the INDICATE key and battery, thus operating relay LIa. The LIa relay (FIG. 14) in operating locks operated directly to the INDICATE key battery (FIG. 13) through its make contcat 14LIa-8. Relay LI operated closes the INDICATE key battery through make contact 14LIa-7 (FIG. 14) to the make contact of the operated indicating relay, which in the case assumed is make contact 14GBa-12. Group indicating lamp GB (FIG. 14) is consequently lighted as a circuit is completed to ground through the lamp and make contact 13R1-2T (FIG. 13). The other group indicating lamps GA, GC, or GD may be lighted in like manner over similar conducting paths.

The operation of relay LIa (FIG. 14) also initiates the slow release of relay LB (FIG. 13) as a result of the opening of break contact 14LIa-11 through which relay LB was locked operated as described. When relay LB releases, it connects the INDICATE key battery through break contact 13LB-1B, make contact 14LIa-9, break contact 13BE-1B through winding 906 of repeat coil RCOL1 (FIG. 9), and make contact 13R2-2B to lead CR. The CRS relay (FIG. 10) whose winding had been reconnected to the CR lead as previously described will then operate. The operation of relay CRS results in the operation of relay LI (FIG. 4) by closing a circuit from battery through the primary winding of relay LI, make contact 10CRS-5 and break contact 10RL-7 to ground. The operation of relay LI closes a resistance shunt on its secondary winding through make contact 4LI-11, break contact 10ICT-6 and resistor LIS to make relay LI slow to release. Consequently, relay LI holds operated over a period which extends from the release of relay CRS until the reoperation of relay ICT when the loop indication is transmitted in a manner yet to be described.

When relay LB (FIG. 13) releases, it recloses a path for the slow operation of relay BD. This circuit may be traced from battery through the INDICATE key, break contact 13LB-1T and the winding of relay BD to ground through make contact 13R1-2T. The operation of relay BD again operates relay BE through a circuit from ground through the winding of relay BE and make contacts 13BD-1B to the INDICATE key battery. Relay LB is also reoperated through the operation of relay BD over a circuit from the INDICATE key battery, through make contact 13BD-1T, the winding of relay LB and thence to ground through make contact 13R1-2T. During the time of the operation of relay LB, relay BE, operated, removes the battery from lead 950 by opening break contact 13BE-1B. The operation of relay BE also again closes through leads T and R from the 135 cycle generator circuit to repeat coil RCOL1 causing the 135 cycle signal to be reapplied to the I and CR leads (FIG. 10) thus reoperating relay AC as previously described. Relay AC operated reoperates relay ICT. If relay ICT reoperates within the slow release time of relay LI, following the release of relay CRS, relay LI will lock operated on its secondary winding to the reoperated relay ICT through a circuit extending from ground (FIG. 4) through make contact 10ICT-6, make contact 4LI-11, the secondary winding of relay LI, and through resistor LIB to battery.

Relay LI operated transfers the leads from the group registration relays (FIG. 10) and associated resistors to the loop registration relays and associated resistors causing the loop indication to be transmitted to the observing desk circuits shown in FIG. 9. As many as twenty-five loop indications may be transmitted by suitable combinations of the operated loop-indication registration relays TLH through ILB shown in FIG. 6. Assume, for example, that a loop indication numbered 6 is to be transmitted. In such a case, loop registration relays operated are relays TLL, RLB and ILH. In FIG. 10, low resistance battery is connected to the T lead, a blank is on the R lead and high resistance battery is on the I lead in the direction of the service observing desk as seen from the circuit shown in FIG. 9. The identification relay circuit of FIG. 9 responds to the resulting signal by the operation of relays B, C, and D. The circuit for operating these relays may be traced from battery through make contact 6TLL–1 (FIG. 10), resistor TLL, make contact 4LI–10, make contact 10ICT–3, inductor TR, compensating resistor TC to the T lead, through winding 902 of repeat coil RCOL2 (FIG. 9), the lower winding of inductor TR, resistor E, make contact 13R1–4T, through the winding of relay C and the winding of relay D, through the winding of the polarized relay NGI, winding 906 of repeat coil RCOL1, make contact 13R2–2B to the CR lead, compensating resistor CRC (FIG. 10), make contact 10ICT–4, inductor CRI, make contact 4LI–2 and thence to ground through resistor CR2. The completion of the path described results in the operation of relays C and D.

Relay B (FIG. 9) is operated in a like manner by the completion of a path from battery through make contact 6ILH–12 (FIG. 10), resistor ILH, resistor ILL, resistor ILC, make contact 4LI–1, inductor CRI, make contact 10ICT–3, compensating resistor IC to the I lead (FIG. 9), make contact 13R2–4T, winding 905 of repeat coil RCOL1, the winding of relay A, the winding of relay B, and thence through the winding of relay NGI to ground. Relay A, although in the closed path described does not operate because of the high resistance of resistor ILH.

The polarity of the signal through the winding of polarized relay NGI (FIG. 9) corresponds to its operating polarity. Relay NGI operated holds relay BE operated through a circuit extending from ground, through the winding of relay BE, make contact 13BE–6B (FIG. 13), make contact 14LIa–5(FIG. 14), and make contact 9NGI–5 and by way of lead 131 to the INDICATE key battery (FIG 13). Relays B, C, and D operated result in the operation of associated relays B1, C1, and D1 (FIG. 14), which in turn complete a path for lighting lamp L6 (FIG. 12). The lamp circuit extends from ground (FIG. 8) through break contact 14A1–2T, make contact 14B1–2T and thence by way of lead 802 to make contact 14C1–4T (FIG. 12), break contact 14E2–4B, break contact 14F2–4B, through lamp L6, through make contact 14LIa–10 (FIG. 13) and through break contact 13BD–1T to the INDICATE key battery. For the duration of the release time of relay BD, which commences with the second operation of relay LB, battery is withheld from the L0 lead to the indicating lamps which prevents the lamps from being falsely lighted in the event that a line surge causes any of the indicating relays to operate momentarily upon the initial closure of their corresponding circuits. In a similar manner the other indicating lamps L1 through L5 and L7 through L26 shown in FIGS. 8 and 12 may be lighted through circuits which include indicating translating relays A1, B1, C1, D1, E1, E2, E3, F1, F2, and F3, shown in FIG. 14.

*Restoration of circuit to normal after identification*

When the observer has completed the identification of the trunk being observed upon, the INDICATE key is released, releasing relay SR. The group indicating relay GA, GB, GC, or GD which is operated also releases to extinguish the lighted group indicating lamp GA, GB, GC, or GD (FIG. 14). Relay LI releases and the lighted loop indicating lamp L1 through L25 is extinguished. Relay SR (FIG. 13), in releasing, extinguishes the indicating pilot lamp 904 and also releases relays R1 and R2 by opening the previously identified operating paths. Relays R1 and R2 (FIG. 13) disconnect the trunk from the indicating relay circuits shown in FIG. 9, thereby releasing the appropriate combination of operated indicating relays A, B, C, D, E, and F. In turn, the associated operated translating relays A1, B1, C1, D1, E1, E2, E3, F1, F2, and F3 (FIG. 14) are also released, restoring the indicating relay circuit to normal. Relay BE releases, disconnecting the 135 cycle signal from the circuit of FIG. 9, causing the release of relay AC shown in FIG. 10. The release of relay AC releases relay ICT which in turn releases relay LI. Relay ICT in releasing also removes the resistance battery from the T, R, and/or I leads and the CF2 resistance ground from the CR lead. The ground through the windings of relays RL and CRS and make contact 7SD–4 is reconnected to the CR lead through break contact 10ICT–4.

When the observer has completed the observation, the release key (FIG. 13) is operated, thereby applying a relatively high voltage through make contact 9TL–2B and break contact 13R2–2T to the CR lead to operate relays RL and CRS (FIG. 10). The operation of relay RL is employed in conventional fashion to initiate the operation of the release circuit 126 (FIG. 1), thereby releasing the observing circuit. Relay T (FIG. 9) and CR (FIG. 13) thence release, extinguishing trunk lamp GUARD and position lamp SUB, thereby indicating to the observer that the service observing circuit has released. The observer must then release the trunk key OBS (FIG. 9) which releases relay TL, thereby restoring the service observing desk circuit to normal.

It is to be understood that the embodiment described is merely illustrative of the application of the principles of this invention. Numerous other arrangements may be designed by those skilled in the art without departing from the spirit and scope of the invention.

What is claimed is:

1. In a telephone system including a plurality of attendant-controlled private branch exchanges each associated with a respective one of a plurality of trunks, a service observing circuit comprising means for storing a plurality of numerical indications each corresponding to the calling number of a respective one of said private branch exchanges, means responsive to dial pulses on any one of said trunks for comparing the number corresponding to said dial pulses with the numbers corresponding to said indications, and means responsive only to a match between a stored one of said numerical indications and a number corresponding to said dial pulses as determined by said comparing means for generating a service observing alerting signal, whereby service observing may be restricted to calls made to said private branch exchange attendants and avoided with respect to calls processed automatically by said exchanges.

2. In a telephone system a crossbar tandem office including, in combination, a marker, a sender and a service observing circuit, a plurality of attendant-controlled PBX's each including a plurality of extensions, a first plurality of switched trunks each extending from said tandem office to a respective one of said PBX's, and a second plurality of direct trunks each extending from said tandem office directly to the attendant's station at a respective one of said PBX's, said service observing circuit comprising means for alerting the observing operator of said circuit, first means for operating said alerting means responsive only to outpulsing by said sender on any of said first plurality of trunks indicative of the address of the attendant's station at a respective one of said PBX's, and second means for operating said alerting means responsive to the presence of any call on any of said second plurality of trunks, whereby said observing operator is alerted only for calls directed to the operators of said PBX's irrespective of the presence of a call on any of said second plurality of trunks which is addressed to one of said extensions.

3. Apparatus in accordance with claim 2 wherein said first means includes means for storing a plurality of groups of numerical indications each representative of the signal address of a corresponding one of said PBX attendant's stations, means for comparing said outpulsing of said sender with each of said groups of stored indications, and means responsive to a match between the outpulsing of said sender and any of said groups for operating said alerting means.

4. In a telephone system including a central switching point, a plurality of intermediate switching points and a plurality of trunks each connecting said central switching point to a respective one of said intermediate switching points, a service observing circuit at said central switching point comprising, in combination, a plurality of groups of multiposition switches, each group being preset to correspond to a number identifying a respective one of said intermediate switching points, means responsive to a match between the number corresponding to a group of signal pulses applied to any of said trunks and the number corresponding to the preset condition of one of said groups of multiposition switches for providing a visual indication of the presence of a call to be observed, and means for providing a visual indication of the identity of the trunk carrying the call to be observed, whereby the observer is alerted to the presence of a preselected category of calls appearing on said trunks irrespective of the presence of other calls on said trunks outside of said preselected category.

5. Apparatus in accordance with claim 4 wherein said service observing circuit includes means responsive to calls placed on a particular one of said trunks for providing a visual indication of the presence of a call to be observed irrespective of whether signal pulses are applied to said last named trunk.

6. In a telephone system including a central switching point, a plurality of intermediate switching points, a plurality of trunks each connecting said central switching point to a respective one of said intermediate switching points, means for applying groups of signaling pulses to said trunks indicative of the signal address of said intermediate switching points, a service observing circuit comprising means for detecting said signaling pulses, means for counting detected ones of said signaling pulses, means for mechanically storing information indicative of the signal addresses of said intermediate switching points, means responsive to said groups of signaling pulses for comparing the signal addresses indicated thereby with the signal addresses held by said storing means, means operative upon the determination of a match between one of said groups of signaling pulses and a stored one of said signal addresses by said comparing means for providing a visual indication of the presence of a call to be observed, and manually operable means for determining the identity of the trunk carrying the call to be observed.

7. Apparatus in accordance with claim 6 including means responsive to calls placed on a particular one of said trunks for providing a visual indication of the presence of a call to be observed irrespective of whether signal pulses are applied to said last named trunk.

8. In a telephone system including a central switching point, a plurality of private branch exchanges, a plurality of direct trunks each connecting a respective one of said private branch exchanges to said central switching point, a plurality of switched trunks each connecting a respective one of said private branch exchanges to said central switching point, means including said switched trunks for applying calls preceded by pulses address signals to corresponding ones of said private branch exchanges, means including said direct trunks for applying calls directly to corresponding ones of said private branch exchanges, a service observing circuit comprising means for storing information indicative of the pulse addresses of each of said private branch exchanges, means including said storing means for comparing said information indicative of said pulse addresses with said pulse address signals, means responsive to a match between one of said pulse address signals and a stored one of said pulse addresses as determined by said comparing means for providing a visual signal indicative of the presence of a call to be observed, and means responsive to the presence of a call on one of said direct trunks for providing a visual signal indicative of the presence of a call to be observed, thereby alerting the service observer only on calls terminating at said private branch exchanges.

9. In a telephone system including a central switching point, a plurality of private branch exchanges, a plurality of direct trunks each connecting a respective one of said private branch exchanges to said central switching point, a plurality of switched trunks each capable of being switched to interconnect said central switching point with one of said private branch exchanges, means including said direct trunks for directing calls to corresponding ones of said private branch exchanges, means including said switched trunks responsive to a call preceded by pulse signal groups indicative of the signal address of one of said private branch exchanges for directing said last named call to said last named exchange, a service observing circuit comprising means for storing information indicative of the pulse address of each of said private branch exchanges, means for detecting said signaling pulses, means for counting detected ones of said signaling pulses, means including said storing means and said counting means for comparing each pulse count with the pulse addresses held by said storing means, means operative upon the determination of a match by said comparing means for providing a visual signal indicating the presence of a call to be observed and means responsive to the presence of a call on any one of said direct trunks for providing a visual signal indicating the presence of a call to be observed thereby alerting the service observer only on calls terminating at said private branch exchanges.

10. Apparatus in accordance with claim 9 wherein said storing means comprise groups of multiposition rotary switches, each group being preset to correspond to the directory number of a respective one of said private branch exchanges.

11. In a telephone system including a central switching point, a plurality of intermediate switching points and a plurality of trunks each connecting said central switching point to a respective one of said intermediate switching points, a service observing circuit comprising observer alerting means, and means for operating said alerting means responsive only to calls on said trunks which calls include address signals indicative of said intermediate switching points as ultimate destinations of said calls, whereby said alerting means remains unoperated in the presence of calls on said trunks having ultimate destinations other than said intermediate switching points, said central switching point comprising a crossbar tandem office and said intermediate switching points comprising private branch exchanges.

References Cited by the Examiner
UNITED STATES PATENTS

| | | | |
|---|---|---|---|
| 1,350,875 | 8/20 | Martin | 179—8 |
| 1,691,554 | 11/28 | Saville | 179—175.2 |
| 2,709,722 | 5/55 | Rosene | 179—175.2 |
| 2,875,286 | 2/59 | Blashfield | 179—8 |
| 2,913,526 | 11/59 | Smits et al. | 179—175.2 |

ROBERT H. ROSE, *Primary Examiner.*
WALTER L. LYNDE, *Examiner.*